(12) United States Patent
Kawabata et al.

(10) Patent No.: US 6,340,847 B1
(45) Date of Patent: Jan. 22, 2002

(54) POWER OUTPUT APPARATUS AND METHOD OF CONTROLLING THE SAME

(75) Inventors: Yasutomo Kawabata, Aichi-ken; Shigeru Matsuhashi; Nobuyoshi Takagi, both of Toyota; Akihiko Kanamori, Okazaki; Eiji Yamada, Owariasahi, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/484,795

(22) Filed: Jan. 18, 2000

(30) Foreign Application Priority Data

Feb. 4, 1999 (JP) ............................................. 11-027615

(51) Int. Cl.⁷ .......................... F02N 11/02; F02N 11/06; H02P 9/00; H02P 9/04
(52) U.S. Cl. ........................... 290/40 C; 290/17; 290/21
(58) Field of Search ................................. 290/40 C, 45; 318/139; 180/65.2; 60/487; 475/81

(56) References Cited

U.S. PATENT DOCUMENTS

| | | | |
|---|---|---|---|
| 5,844,342 A | | 12/1998 | Miyatani et al. |
| 5,973,460 A | * | 10/1999 | Taga et al. .................... 318/139 |
| 5,991,683 A | * | 11/1999 | Takaoka et al. .............. 701/102 |
| 5,998,901 A | * | 12/1999 | Kawabata et al. ........... 310/114 |
| 6,005,297 A | * | 12/1999 | Sasaki et al. .............. 290/40 C |
| 6,005,358 A | * | 12/1999 | Radev .......................... 318/139 |
| 6,064,161 A | * | 5/2000 | Takahara et al. ............. 318/139 |
| 6,067,801 A | * | 5/2000 | Harada et al. .................. 60/175 |
| 6,186,255 B1 | * | 2/2001 | Shimasaki et al. ........... 180/65.3 |
| 6,208,034 B1 | * | 3/2001 | Yamaguchi ................ 290/40 C |
| 6,209,672 B1 | * | 4/2001 | Severinsky ................. 180/65.2 |

FOREIGN PATENT DOCUMENTS

| | | |
|---|---|---|
| DE | 33 38 548 A1 | 5/1985 |
| DE | 196 32 855 A1 | 2/1997 |
| EP | 0 820 894 A2 | 1/1998 |
| JP | 9-47094 | 2/1997 |

* cited by examiner

*Primary Examiner*—Nestor Ramirez
*Assistant Examiner*—Julio C. Gonzalez
(74) *Attorney, Agent, or Firm*—Oliff & Berridge, PLC

(57) ABSTRACT

In a power output apparatus of the present invention, a control unit sets a WOT (wide open throttle) line L2, where the maximum torque of an engine attains, as a boundary between an over drive area and an under drive area in the case where a rotor shaft of an assist motor is set in a state of over drive linkage. The control unit determines a target working point of an outer rotor shaft of a clutch motor, which functions as a drive shaft, based on an externally required output, and selects the WOT line L2 as a performance line of the engine in the case where the target working point of the outer rotor shaft is present in the under drive area. The control unit then sets a switching instruction flag, in order to change the state of linkage of the rotor shaft of the assist motor from the state of over drive linkage to a state of under drive linkage. This arrangement of the invention reduces the maximum load capacity of the assist motor and decreases the maximum electric current of an inverter circuit for driving the assist motor.

16 Claims, 11 Drawing Sheets

WORKING CHARACTERISTICS OF POWER OUTPUT APPARATUS

OUTPUT CHARACTERISTICS OF ASSIST MOTOR

CURRENT-TORQUE CHARACTERISTICS OF ASSIST MOTOR

POWER OUTPUT APPARATUS AND METHOD OF CONTROLLING THE SAME

BACKGROUND OF THE INVENTION

1. Field of the Invention

The present invention relates to a power output apparatus including both an engine and a motor as the power source, as well as to a method of controlling such a power output apparatus. More specifically the invention pertains to a power output apparatus having a linkage mechanism that causes the motor to be linked with either one of an output shaft of the engine and a drive shaft.

2. Description of the Related Art

One of the recently proposed techniques is a hybrid vehicle with a power output apparatus mounted thereon, which includes both an engine and a motor as the power source (for example, JAPANESE PATENT LAID-OPEN GAZETTE No. 9-47094). A parallel hybrid vehicle is one of the hybrid vehicles. In the parallel hybrid vehicle, the power output apparatus mounted thereon causes part of the power output from the engine to be transmitted to a drive shaft via a power regulation unit and the residual part to be regenerated as electric power. The regenerated electric power may be accumulated in a battery or used to drive the motor, which is the power source other than the engine. The power output apparatus controls the power regulation unit and the motor in the course of transmission of the power and thereby enables the power output from the engine to be converted into an arbitrary combination of the revolving speed and the torque and output to the drive shaft. In the hybrid vehicle, the engine can thus be driven at a selected driving point having a high driving efficiency, irrespective of the required output to the drive shaft. Compared with the conventional vehicle having only the engine as the driving source, the hybrid vehicle desirably saves the resources and has reduced emissions.

The motor in the power output apparatus may be linked with either one of the drive shaft and an output shaft of the engine. In the arrangement of linking the motor with the drive shaft, the driving efficiency is improved in the under drive state where the revolving speed of the drive shaft is lower than the engine speed. In the arrangement of linking the motor with the output shaft of the engine, on the other hand, the driving efficiency is improved in the over drive state where the revolving speed of the drive shaft is higher than the engine speed. These characteristics are ascribed to the circulation of the power discussed below.

The process of power transmission when the motor is linked with the drive shaft is described with reference to FIGS. 13 and 14. In this example, an output shaft or crankshaft CS of an engine EG is linked with a drive shaft DS via a pair-rotor motor CM functioning as the power regulation unit, and an assist motor AM is connected with the drive shaft DS. FIG. 13 shows a flow of power in the under drive condition that converts the power output from the engine EG to a combination of a lower revolving speed and a greater torque and causes the converted power to be output to the drive shaft DS. A power PU1 output from the engine EG is transmitted as a power PU2 having a lower revolving speed by the pair-rotor motor CM. There is a relative slide between two rotors in the pair-rotor motor CM, and electric power is generated according to a revolving speed difference between the two rotors. Part of the power PU1 output from the engine EG is accordingly regenerated as an electric power EU1. The assist motor AM carries out the power operation with the regenerated electric power EU1 to compensate for a deficiency of torque. A resulting power PU3 output to the drive shaft DS accordingly has the required revolving speed and torque.

FIG. 14 shows a flow of power in the over drive condition that converts the power output from the engine EG to a combination of a higher revolving speed and a smaller torque and causes the converted power to be output to the drive shaft DS. The power PU1 output from the engine EG is transmitted as a power PU4 having a higher revolving speed by the pair-rotor motor CM, which carries out the power operation. The assist motor AM applies a load to compensate for a surplus of torque. A resulting power PU5 output to the drive shaft DS accordingly has the required revolving speed and torque. The assist motor AM regenerates part of the power PU4 as an electric power EU2, so as to apply the load. The regenerated electric power EU2 is supplied to the pair-rotor motor CM.

In the under drive condition, the electric power regenerated by the pair-rotor motor CM positioned on the upstream is supplied to the assist motor AM positioned on the downstream in the course of transmitting the power output from the engine EG to the drive shaft DS. In the over drive condition, on the other hand, the electric power regenerated by the assist motor AM positioned on the downstream is supplied to the pair-rotor motor CM positioned on the upstream. The electric power supplied to the pair-rotor motor CM is again supplied as mechanical power to the assist motor AM positioned on the downstream. There is accordingly a power circulation $\gamma 1$ in the over drive condition as shown in FIG. 14. The power circulation $\gamma 1$ reduces the percentage of the power effectively transmitted to the drive shaft DS to the power output from the engine EG, thereby lowering the driving efficiency of the hybrid vehicle.

The process of power transmission when the motor is linked with the output shaft of the engine is described with reference to FIGS. 15 and 16. FIG. 15 shows a flow of power in the under drive condition, and FIG. 16 shows a flow of power in the over drive condition. The phenomena observed under the condition of linkage of the motor with the output shaft are reverse to the phenomena under the condition of linkage of the motor with the drive shaft. In the under drive condition, an electric power EO1 regenerated by the pair-rotor motor CM positioned on the downstream is supplied to the assist motor AM positioned on the upstream. In the over drive condition, on the other hand, an electric power EO2 regenerated by the assist motor AM positioned on the upstream is supplied to the pair-rotor motor CM positioned on the downstream. There is accordingly a power circulation $\gamma 2$ in the under drive condition as shown in FIG. 15, in the case where the motor is linked with the output shaft of the engine. This lowers the driving efficiency of the hybrid vehicle.

By taking into account the above phenomena, a proposed hybrid vehicle has a power output apparatus mounted thereon, which enables the destination of linkage of the motor to be switched between the drive shaft and the output shaft of the engine (for example, the hybrid vehicle disclosed in JAPANESE PATENT LAID-OPEN GAZETTE No. 10-75501). The power output apparatus has a first clutch that allows engagement and disengagement between the motor and the output shaft of the engine and a second clutch that allows engagement and disengagement between the motor and the drive shaft. When the engine speed is higher than the revolving speed of the drive shaft, the first clutch disengages while the second clutch engages. This causes the motor to be linked with the drive shaft. When the engine speed is lower than the revolving speed of the drive shaft, on the contrary, the first clutch engages while the second clutch disengages. This causes the motor to be linked with the output shaft of the engine. This mechanism ensures the high driving efficiency both in the under drive condition and in the over drive condition.

In the proposed power output apparatus that changes the state of linkage of the motor, for the further improvement of the driving efficiency, the working point of the engine is set along a certain performance line where the highest efficiency of the engine attains, that is, the performance line attaining the optimum fuel consumption of the engine, both in the under drive condition and in the over drive condition.

In the under drive condition, it is accordingly required to raise the maximum load capacity of the motor and increase the maximum electric current of an inverter circuit for driving the motor, in order to ensure a sufficient level of the maximum torque output from the drive shaft.

SUMMARY OF THE INVENTION

The object of the present invention is thus to provide a power output apparatus that reduces the maximum load capacity of a motor and decreases the maximum electric current of an inverter circuit for driving the motor, as well as to provide a method of controlling such a power output apparatus.

At least part of the above and the other related objects is actualized by a power output apparatus including an engine with an output shaft, a drive shaft to which power is output, a power regulation unit that is connected with both the output shaft and the drive shaft, regulates power output from the engine with input and output of electric power, and transmits the regulated power to the drive shaft, a motor with a rotating shaft, and a linkage mechanism that selectively links the rotating shaft of the motor with either one of the output shaft and the drive shaft. A performance area, which is defined by a relationship between torque and revolving speed, is divided by a first performance line and a second performance line, which has a higher torque in a predetermined range of revolving speed than the first performance line, into a first area that mainly adjoins to the first performance line, a second area that is interposed between the first performance line and the second performance line, and a third area that mainly adjoins to the second performance line. The power output apparatus of the invention further includes: a performance line selection unit that selects either one of the first performance line and the second performance line as an engine performance line that is used to determine a working point of the engine in the performance area; and a control unit that causes the performance line selection unit to select the first performance line as the engine performance line in the case where a working point of the drive shaft is present in the first area, and to select the second performance line as the engine performance line in the case where the working point of the drive shaft is present in the third area.

The present invention is also directed to a method of controlling a power output apparatus, which includes an engine with an output shaft, a drive shaft to which power is output, a power regulation unit that is connected with both the output shaft and the drive shaft, regulates power output from the engine with input and output of electric power, and transmits the regulated power to the drive shaft, a motor with a rotating shaft, and a linkage mechanism that selectively links the rotating shaft of the motor with either one of the output shaft and the drive shaft. A performance area, which is defined by a relationship between torque and revolving speed, is divided by a first performance line and a second performance line, which has a higher torque in a predetermined range of revolving speed than the first performance line, into a first area that mainly adjoins to the first performance line, a second area that is interposed between the first performance line and the second performance line, and a third area that mainly adjoins to the second performance line. The method of the present invention includes the steps of: (a) selecting either one of the first performance line and the second performance line as an engine performance line that is used to determine a working point of the engine in the performance area; and (b) selecting the first performance line as the engine performance line in the case where a working point of the drive shaft is present in the first area, and selecting the second performance line as the engine performance line in the case where the working point of the drive shaft is present in the third area.

The power output apparatus of the present invention and the method of controlling the power output apparatus select either one of the first performance line and the second performance line as the engine performance line that is used to determine the working point of the engine, in the performance area defined by the relationship between the torque and the revolving speed. Here the second performance line has a higher torque in a predetermined revolving speed range than the first performance line. The performance area is divided by the first performance line and the second performance line into the first through the third areas. In the case where the working point of the drive shaft is present in the first area, the first performance line is selected as the engine performance line. In the case where the working point of the drive shaft is present in the third area, the second performance line is selected as the engine performance line. The first area is included in an area of over drive operation, whereas the third area is included in an area of under drive operation. When the working point of the drive shaft is present in the third area, the power output apparatus is set in the under drive condition. In the under drive condition, the working point of the engine is determined according to the second performance line selected as the engine performance line. The torque output from the drive shaft in the under drive condition is equal to the sum of the torque output from the motor and the torque output from the engine. Application of the second performance line, which has a higher torque in the predetermined revolving speed range than the first performance line, for the engine performance line increases the torque output from the engine. The technique of the invention thus enables the torque (especially the maximum torque) output from the drive shaft to be kept at an equivalent level to the value attained by the conventional technique even when the smaller torque is output from the motor.

The power output apparatus of the present invention and the method of controlling the power output apparatus desirably reduce the maximum load capacity of the motor and decrease the maximum electric current of the inverter circuit for driving the motor, while ensuring a sufficient level of the maximum torque output from the drive shaft in the case of under drive operation. These characteristics advantageously reduce the size of the motor and decrease the manufacturing cost of the inverter circuit.

In accordance with one preferable application of the present invention, the power output apparatus further includes an area determination unit that determines an area, in which a target working point of the drive shaft is present, based on an externally required output. In the case where the first performance line has been selected as the engine performance line, the control unit causes the performance line selection unit to change the selected engine performance line from the first performance line to the second performance line when the area determination unit determines that the target working point of the drive shaft is present in the third area. In the case where the second performance line has been selected as the engine performance line, the control unit causes the performance line selection unit to change the selected engine performance line from the second performance line to the first performance line when the area determination unit determines that the target working point of the drive shaft is present in the first area.

Similarly, in this preferable application of the present invention, the method further includes the steps of: (c) determining an area, in which a target working point of the drive shaft is present, based on an externally required output; and (d) in the case where the first performance line has been selected as the engine performance line, changing the selected engine performance line from the first performance line to the second performance line when it is determined in the step (c) that the target working point of the drive shaft is present in the third area, and in the case where the second performance line has been selected as the engine performance line, changing the selected engine performance line from the second performance line to the first performance line when it is determined in the step (c) that the target working point of the drive shaft is present in the first area.

In the power output apparatus or the method of the present invention having the above application, in the case where the first performance line is currently used for the engine performance line, the selected engine performance line is changed from the first performance line to the second performance line when the target working point of the drive shaft is present in the third area. This arrangement ensures the smooth change of the engine performance line when the state of the power output apparatus is changed from the over drive operation to the under drive operation. In the case where the second performance line is currently used for the engine performance line, the selected engine performance line is changed from the second performance line to the first performance line when the target working point of the drive shaft is present in the first area. This arrangement also ensures the smooth change of the engine performance line when the state of the power output apparatus is changed from the under drive operation to the over drive operation.

In accordance with another preferable application of the power output apparatus, in the case where the first performance line has been selected as the engine performance line, the control unit causes the performance line selection unit to keep the selection of the first performance line as the engine performance line even when the working point of the drive shaft is present in the second area, until the area determination unit determines that the target working point of the drive shaft is present in the third area. In the case where the second performance line has been selected as the engine performance line, the control unit causes the performance line selection unit to keep the selection of the second performance line as the engine performance line even when the working point of the drive shaft is present in the second area, until the area determination unit determines that the target working point of the drive shaft is present in the first area.

In the case where the working point of the drive shaft is present in the second area, which is defined by the first performance line and the second performance line, the currently selected performance line is continuously used as the engine performance line. This arrangement favorably prevents the frequent change of the engine performance line.

In accordance with still another preferable application of the power output apparatus, the control unit causes the linkage mechanism to link the rotating shaft of the motor with the output shaft of the engine in the case where the working point of the drive shaft is present in the first area. The control unit causes the linkage mechanism to link the rotating shaft of the motor with the drive shaft in the case where the working point of the drive shaft is present in the third area.

In this application, the method of the present invention further includes the step of: (c) causing the linkage mechanism to link the rotating shaft of the motor with the output shaft of the engine in the case where the working point of the drive shaft is present in the first area, and causing the linkage mechanism to link the rotating shaft of the motor with the drive shaft in the case where the working point of the drive shaft is present in the third area.

In the power output apparatus and the method of the present invention having the above application, when the working point of the drive shaft is present in the first area, the power output apparatus is set in the condition of over drive operation. The linkage of the rotating shaft of the motor with the output shaft of the engine thus enhances the driving efficiency. When the working point of the drive shaft is present in the third area, on the other hand, the power output apparatus is set in the condition of under drive operation. The linkage of the rotating shaft of the motor with the drive shaft thus enhances the driving efficiency.

In the power output apparatus of the above application, in the case where the rotating shaft of the motor has been linked with the output shaft of the engine, the control unit causes the linkage mechanism to keep the linkage of the rotating shaft of the motor with the output shaft even when the working point of the drive shaft is present in the second area. In the case where the rotating shaft of the motor has been linked with the drive shaft, the control unit causes the linkage mechanism to keep the linkage of the rotating shaft of the motor with the drive shaft even when the working point of the drive shaft is present in the second area.

The method of the above application preferably includes the step of: (d) in the case where the rotating shaft of the motor has been linked with the output shaft of the engine, causing the linkage mechanism to keep the linkage of the rotating shaft of the motor with the output shaft even when the working point of the drive shaft is present in the second area, and in the case where the rotating shaft of the motor has been linked with the drive shaft, causing the linkage mechanism to keep the linkage of the rotating shaft of the motor with the drive shaft even when the working point of the drive shaft is present in the second area.

In the power output apparatus and the method of the present invention having the above application, even when the working point of the drive shaft enters the second area, which is defined by the first performance line and the second performance line, the destination of linkage of the rotating shaft of the motor is not changed. This arrangement favorably prevents the state of linkage of the rotating shaft of the motor from being changed frequently.

In the power output apparatus of the above application, in the case where the rotating shaft of the motor has been linked with the output shaft of the engine, the control unit causes the linkage mechanism to change the destination of linkage of the rotating shaft of the motor from the output shaft to the drive shaft when the working point of the drive shaft exceeds the second performance line. In the case where the rotating shaft of the motor has been linked with the drive shaft, the control unit causes the linkage mechanism to change the destination of linkage of the rotating shaft of the motor from the drive shaft to the output shaft when the working point of the drive shaft exceeds the first performance line.

The method of the above application preferably includes the step of: (e) in the case where the rotating shaft of the motor has been linked with the output shaft of the engine, causing the linkage mechanism to change the destination of linkage of the rotating shaft of the motor from the output shaft to the drive shaft when the working point of the drive shaft exceeds the second performance line, and in the case where the rotating shaft of the motor has been linked with the drive shaft, causing the linkage mechanism to change the destination of linkage of the rotating shaft of the motor from the drive shaft to the output shaft when the working point of the drive shaft exceeds the first performance line.

In the power output apparatus and the method of the present invention having the above application, in the case where the rotating shaft of the motor is currently linked with the output shaft of the engine, the destination of linkage of the rotating shaft of the motor is smoothly changed at the time when the state of the power output apparatus is changed from the over drive condition to the under drive condition. In the case where the rotating shaft of the motor is currently linked with the drive shaft, on the other hand, the destination of linkage of the rotating shaft of the motor is smoothly changed at the time when the state of the power output apparatus is changed from the under drive condition to the over drive condition.

In accordance with one preferable embodiment of the present invention having the above application, the power output apparatus further includes an area determination unit that determines an area, in which a target working point of the drive shaft is present, based on an externally required output. In the case where the rotating shaft of the motor is linked with the output shaft, the control unit causes the performance line selection unit to change the selected engine performance line from the first performance line to the second performance line when the area determination unit determines that the target working point of the drive shaft is present in the third area. In the case where the rotating shaft of the motor is linked with the drive shaft, the control unit causes the performance line selection unit to change the selected engine performance line from the second performance line to the first performance line when the area determination unit determines that the target working point of the drive shaft is present in the first area.

In this preferable embodiment, the method of the present invention further includes the steps of: (f) determining an area, in which a target working point of the drive shaft is present, based on an externally required output; and (g) in the case where the rotating shaft of the motor is linked with the output shaft, changing the selected engine performance line from the first performance line to the second performance line when it is determined in the step (f) that the target working point of the drive shaft is present in the third area, and in the case where the rotating shaft of the motor is linked with the drive shaft, changing the selected engine performance line from the second performance line to the first performance line when it is determined in the step (f) that the target working point of the drive shaft is present in the first area.

In the power output apparatus and the method of the present invention having the above application, in the case where the rotating shaft of the motor is currently linked with the output shaft of the engine, the selected engine performance line is changed from the first performance line to the second performance line when the target working point of the drive shaft is present in the third area. The destination of linkage of the rotating shaft of the motor is changed from the output shaft of the engine to the drive shaft when the working point of the drive shaft exceeds the second performance line. This arrangement minimizes the difference between the revolving speed of the drive shaft and the revolving speed of the output shaft of the engine, thereby enabling the destination of linkage of the rotating shaft of the motor to be smoothly changed. In the case where the rotating shaft of the motor is currently linked with the drive shaft, on the other hand, the selected engine performance line is changed from the second performance line to the first performance line when the target working point of the drive shaft is present in the first area. The destination of linkage of the rotating shaft of the motor is changed from the drive shaft to the output shaft of the engine when the working point of the drive shaft exceeds the first performance line. This arrangement also minimizes the difference between the revolving speed of the drive shaft and the revolving speed of the output shaft of the engine, thereby enabling the destination of linkage of the rotating shaft of the motor to be smoothly changed.

In the power output apparatus of the present invention, it is preferable that the first performance line attains a highest efficiency of the engine, and the second performance line attains a maximum torque of the engine at each revolving speed.

Using the first performance line that attains the highest efficiency of the engine improves the driving efficiency of the engine in the state of over drive operation and thereby enhances the driving efficiency of the whole power output apparatus. Using the second performance line that attains the maximum torque of the engine at each revolving speed maximizes the torque output from the engine in the state of under drive operation. This allows a smaller torque to be output from the motor. This arrangement further reduces the maximum load capacity of the motor and decreases the maximum electric current of the inverter circuit for driving the motor.

In the power output apparatus of the present invention, the power regulation unit may include a pair-rotor motor having a first rotor connected with the output shaft of the engine and a second rotor connected with the drive shaft, or alternatively include a generator with a rotor shaft and a planetary gear having three rotating shafts, which are respectively linked with the output shaft of the engine, the drive shaft, and the rotor shaft.

The power regulation unit may have the configuration of electrical distribution with the pair-rotor motor or alternatively the configuration of mechanical distribution with the planetary gear.

Although the technique of the present invention is directly applied to the power output apparatus and the method of controlling the power output apparatus, the scope of the present invention includes a variety of equipment and apparatuses with the power output apparatus mounted thereon, for example, a hybrid vehicle with the power output apparatus.

These and other objects, features, aspects, and advantages of the present invention will become more apparent from the following detailed description of the preferred embodiment with the accompanying drawings.

DESCRIPTION OF THE PREFERRED EMBODIMENT (1) Structure of Power Output Apparatus

Figure 1:
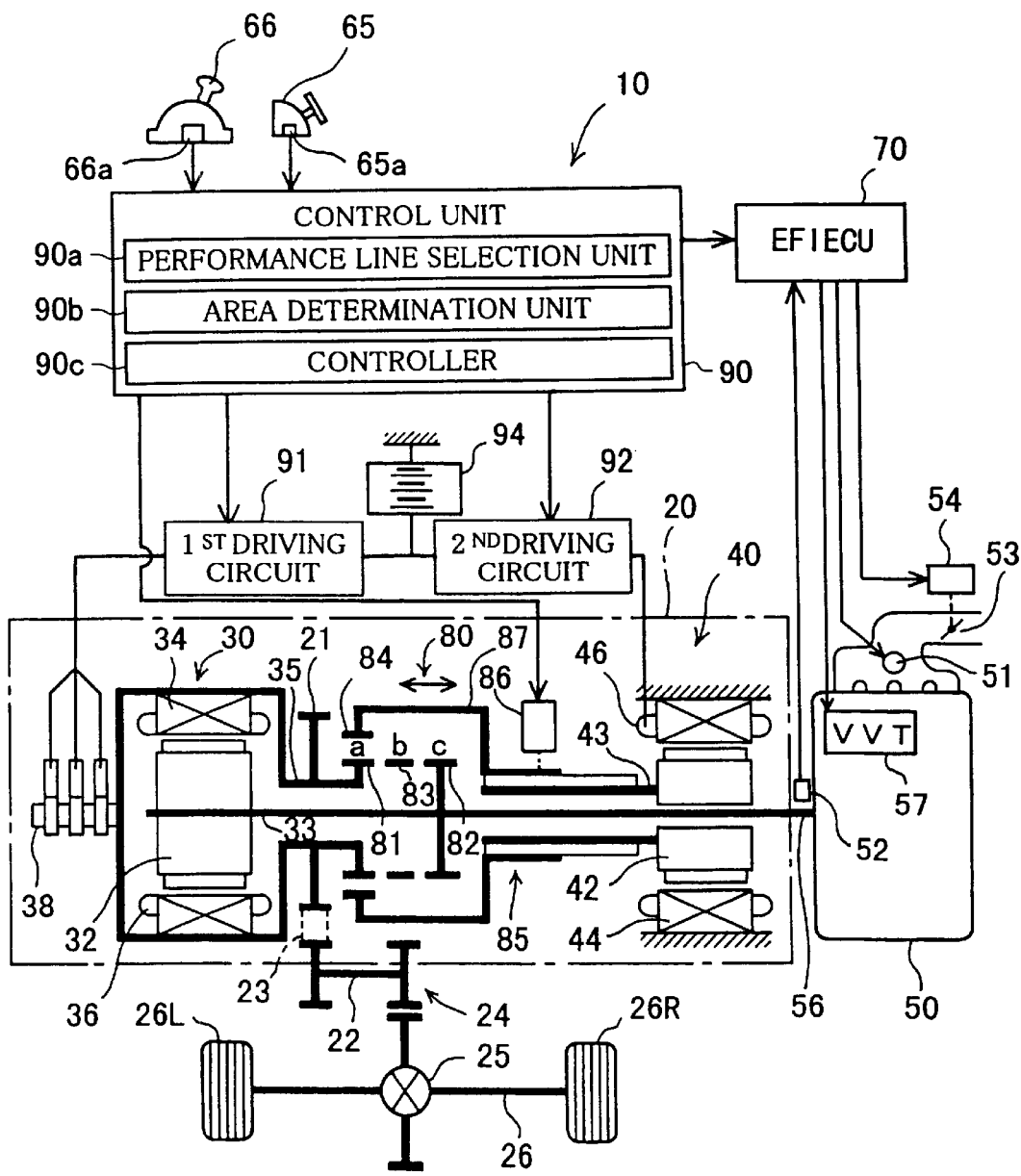
FIG. 1 schematically illustrates a hybrid vehicle with a power output apparatus 10 mounted thereon as one embodiment according to the present invention.

FIG. 1 schematically illustrates a hybrid vehicle with a power output apparatus 10 mounted thereon as one embodiment according to the present invention. The power output apparatus 10 of the embodiment includes an engine 50 and a hybrid unit 20 as a power system, as well as an electronic fuel injection control unit (hereinafter referred to as EFIECU) and a control unit 90 as a control system.

The engine 50 included in the power system is a conventional gasoline engine and rotates a crankshaft 56, which is the output shaft of the engine 50.

The operation of the engine 50 is controlled by the EFIECU 70 included in the control system. The EFIECU 70 is a one-chip microcomputer including a CPU, a ROM, and a RAM. The CPU regulates an amount of fuel injection into the engine 50 and a advance of an intake and exhaust valve (not shown) and carries out other control processes according to programs recorded in the ROM. In order to enable the control processes, the EFIECU 70 is connected with a fuel injection valve 51, a throttle valve motor 54 that regulates a travel of a throttle valve 53, and a VVT 57 that regulates open and close timings of the intake and exhaust valve. The EFIECU 70 is further connected with a variety of sensors that are required for the control processes and represent driving conditions of the engine 50. One of such sensors is a speed sensor 52 that measures the revolving speed of the crankshaft 56. Other sensors and switches are omitted from the illustration.

The hybrid unit 20 is disposed between the crankshaft 56 of the engine 50 and a transmission shaft 22, which outputs power to driving wheels 26L, 26R. The hybrid unit 20 includes a clutch motor 30, which is a pair-rotor motor, an assist motor 40, which is an electric motor, and a linkage switching unit 80 that selectively changes the destination of linkage of a rotor shaft 43 of the assist motor 40.

The clutch motor 30 is basically constructed as a synchronous motor with permanent magnets. The difference of the clutch motor 30 from the conventional motor is that a member with three-phase coils wound thereon to generate a magnetic field is not a stator fixed to a casing of the motor but is a rotatable rotor. In the clutch motor 30, not only an inner rotor 32, which corresponds to a rotor included in the conventional motor, but also an outer rotor 34 with three-phase coils 36 wound thereon is freely rotatable. The motor having this configuration is referred to as the pair-rotor motor. In the pair-rotor motor, since the outer rotor 34 with the three-phase coils 36 wound thereon rotates, a mechanism is required to supply the electric power to the rotating three-phase coils 36. In this embodiment, a slip ring 38 is provided as such a mechanism to supply the electric power to the three-phase coils 36. A differential transformer or another element may, however, be used instead of the slip ring 38. In the clutch motor 30, the inner rotor 32 and the outer rotor 34 rotate relative to each other through an interaction of the magnetic field generated by the permanent magnets mounted on the inner rotor 32 and the magnetic field generated by the three-phase coils 36 wound on the outer rotor 34. This function is reversible, so that the clutch motor 30 may work as a generator and regenerate the electric power corresponding to a difference in revolving speeds of the inner rotor 32 and the outer rotor 34.

In the clutch motor 30, an inner rotor shaft 33 is linked with the inner rotor 32, whereas an outer rotor shaft 35, which functions as a drive shaft, is linked with the outer rotor 34. The inner rotor shaft 33 is connected to the crankshaft 56 via a damper (not shown). The outer rotor shaft 35 is connected with the transmission shaft 22 via an output gear 21 and a chain 23. The transmission shaft 22 is further linked with an axle 26 with driving wheels 26R and 26L via a reduction gear unit 24 and a differential gear 25.

Since both the inner rotor 32 and the outer rotor 34 of the clutch motor 30 are rotatable, the power input through either one of the inner rotor shaft 33 and the outer rotor shaft 35 is transmitted to the other of the inner rotor shaft 33 and the outer rotor shaft 35. The clutch motor 30 itself can not change the torque because of the principle of action and reaction. When the clutch motor 30 works as a motor and performs a power operation, the other shaft rotates at a higher revolving speed, which results in enhancing the power (=revolving speed×torque) output from the other shaft. When the clutch motor 30 works as a generator and performs a regenerative operation, on the other hand, the other shaft rotates at a lower revolving speed, which causes the electric power (=difference in revolving speed×torque) to be taken out corresponding to the difference in revolving speed of the inner rotor shaft 33 and the outer rotor shaft 35. The arrangement of using the clutch motor 30 enables part of the power to be taken out in the form of electric power, while causing the residual power to be transmitted. The clutch motor 30 does not transmit any power in a state that neither the power operation nor the regenerative operation is performed. This state corresponds to a release condition of the mechanical clutch. This is the reason why the pair-rotor motor is called the clutch motor.

Like the clutch motor 30, the assist motor 40 included in the hybrid unit 20 is constructed as a synchronous motor with permanent magnets. In this embodiment, the assist motor 40 has a rotor 42 with permanent magnets mounted thereon and a stator 44 with three-phase coils 46 wound thereon. In the assist motor 40, the stator 44 is fixed to a casing, whereas the rotor 42 is linked with the hollow rotor shaft 43. The inner rotor shaft 33 linked with the crankshaft 56 passes through the center of the hollow rotor shaft 43.

A first driving circuit 91 and a second driving circuit 92, which are connected with a battery 94, are provided to drive the clutch motor 30 and the assist motor 40, respectively. The first driving circuit 91 is constructed as a transistor inverter including a plurality of transistors as switching elements and is electrically connected with the control unit 90 to work under the control of the control unit 90. When the control unit 90 regulates the on-off time of the transistors included in the first driving circuit 91 by PWM control, three-phase alternating currents flow between the battery 94 and the three-phase coils 36 wound on the outer rotor 34 of the clutch motor 30 via the first driving circuit 91 and the slip ring 38, which are interposed therebetween. The flow of the three-phase alternating currents causes a revolving magnetic field to be generated on the outer rotor 34, so as to regulate the rotation of the clutch motor 30. This enables the power operation of the clutch motor 30 using the electric power of the battery 94 and the regenerative operation of the clutch motor 30 to regenerate the electric power, with which the battery 94 is charged.

The assist motor 40 is connected with the battery 94 via the second driving circuit 92. The second driving circuit 92 is also constructed as a transistor inverter and is electrically connected with the control unit 90 to work under the control of the control unit 90. When a control signal output from the control unit 90 switches on and off the transistors included in the second driving circuit 92, three-phase alternating currents flow through the three-phase coils 46 wound on the stator 44, so as to generate a revolving magnetic field and rotate the assist motor 40. The assist motor 40 can perform the regenerative operation in the same manner as the clutch motor 30.

The linkage switching unit 80 disposed in the hybrid unit 20 selectively changes the destination of linkage of the rotor shaft 43 of the assist motor 40 between the outer rotor shaft 35 of the clutch motor 30, the inner rotor shaft 33 of the clutch motor 30, and no linkage.

The linkage switching unit 80 includes a first gear 81 linked with the outer rotor shaft 35 of the clutch motor 30, a second gear 82 linked with the inner rotor shaft 33 of the clutch motor 30, a third gear 83 with no linkage, and a movable member 87. A movable gear 84, which may engage with any one of the first through third gears 81 through 83, is disposed on one side of the movable member 87. The other end of the movable member 87 is slidably connected with the rotor shaft 43 of the assist motor 40 via a spline 85. The movable gear 84 is movable along the axis of the rotor shaft 43, while rotating with the rotor shaft 43. The linkage switching unit 80 is provided with an actuator 86 that drives the movable member 87 to change the position of the movable gear 84. The actuator 86 is actualized by a motor or a solenoid and controlled by the control unit 90.

Figure 2:
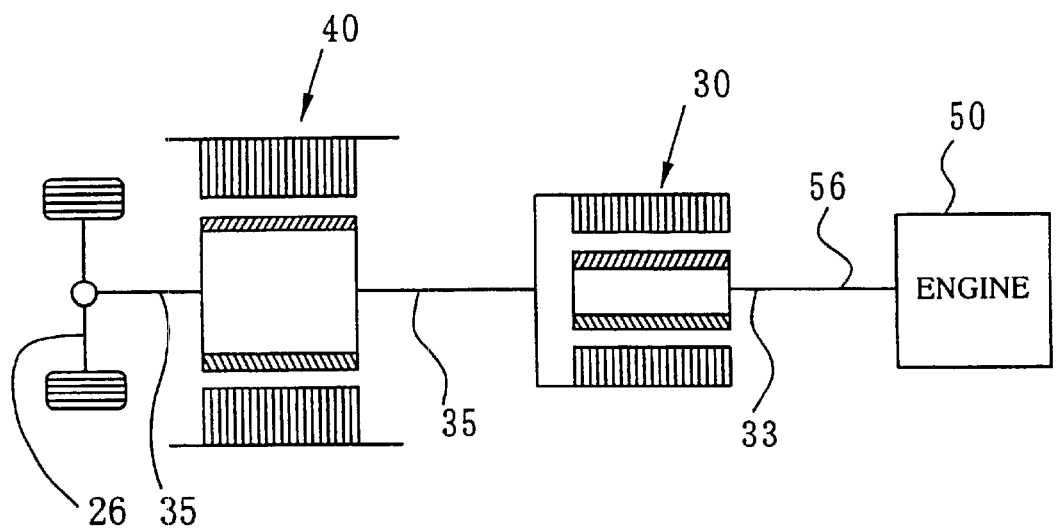
FIG. 2 schematically illustrates a power system in the power output apparatus 10 of the embodiment in a state of under drive linkage.

In the case where the movable gear 84 is at a position 'a' shown in FIG. 1, the movable gear 84 engages with the first gear 81, so that the rotor shaft 43 of the assist motor 40 connects with the outer rotor shaft 35 of the clutch motor 30. In the power output system where the power output from the engine 50 goes through the clutch motor 30 and is output to the drive shaft or the outer rotor shaft 35, the assist motor 40 can thus transmit the power to and from the outer rotor shaft 35. This arrangement is schematically shown in FIG. 2. Namely the structure of FIG. 2 is equivalent to the state in which the linkage switching unit 80 sets the movable gear 84 at the position 'a'. This state of linkage is hereinafter referred to as the state of under drive linkage.

Figure 3:
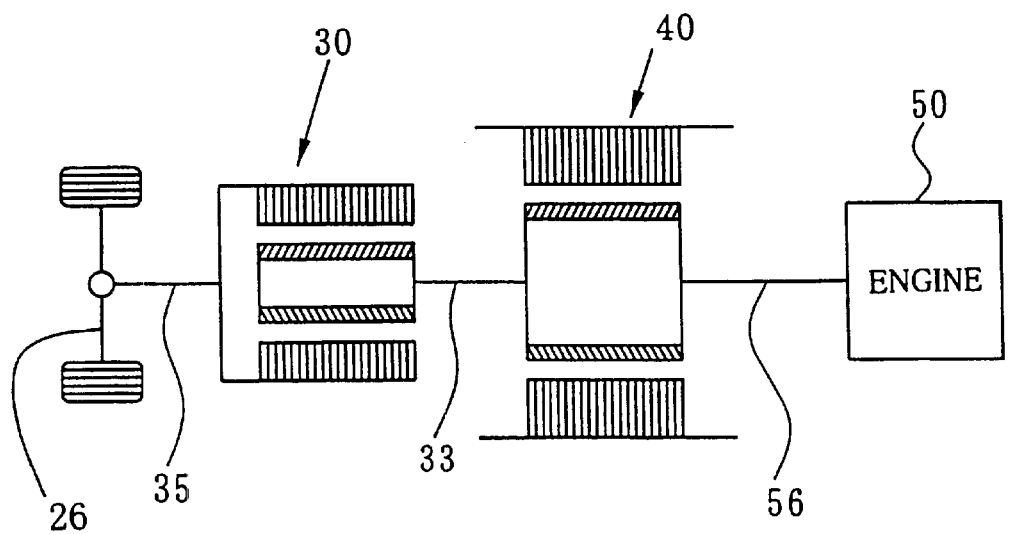
FIG. 3 schematically illustrates a power system in the power output apparatus 10 of the embodiment in a state of over drive linkage.

In the case where the linkage switching unit 80 sets the movable gear 84 at a position 'c' shown in FIG. 1, on the other hand, the movable gear 84 engages with the second gear 82. The rotor shaft 43 of the assist motor 40 accordingly connects with the inner rotor shaft 33 of the clutch motor 30 and further with the crankshaft 56 of the engine 50. In the power output system where the power output from the engine 50 goes through the clutch motor 30 and is output to the drive shaft or the outer rotor shaft 35, the assist motor 40 can thus transmit power to and from both the inner rotor shaft 33 and the crankshaft 56. This arrangement is schematically shown in FIG. 3. Namely the structure of FIG. 3 is equivalent to the state in which the linkage switching unit 80 sets the movable gear 84 at the position 'c'. This state of linkage is hereinafter referred to as the state of over drive linkage.

The linkage switching unit 80 may also set the movable gear 84 at a position 'b' shown in FIG. 1, where the movable gear 84 engages with the third gear 83. At this neutral position, the movable gear 84 engages neither with the first gear 81 nor with the second gear 82. The power output from the engine 50 goes through the clutch motor 30 and is directly output to the drive shaft or the outer rotor shaft 35.

The control unit 90 controls the linkage switching unit 80 according to the running state of the hybrid vehicle as discussed below, so as to change the destination of linkage of the rotor shaft 43 of the assist motor 40.

The linkage switching unit 80 used in this embodiment may include a plurality of clutches, in place of the combination of the first through the third gears 81 through 83 and the movable gear 84. The combination of clutches includes a first clutch that allows engagement and disengagement between the outer rotor shaft 35 and the rotor shaft 43 and a second clutch that allows engagement and disengagement between the inner rotor shaft 33 and the rotor shaft 43. In this case, the spline 85 is omitted.

In this embodiment, the driving state of the hybrid vehicle is controller by the control unit 90. Like the EFIECU 70, the control unit 90 is constructed as a one-chip microcomputer including a CPU, a ROM, and a RAM. The CPU functions, according to the programs recorded in the ROM, as a performance line selection unit 90a, an area determination unit 90b, and a controller 90c, which respectively correspond to the performance line selection unit, the area determination unit, and the control unit disclosed in the appended claims. The CPU accordingly carries out a variety of control procedures discussed later. In order to enable the control operations, the control unit 90 is electrically connected with a variety of sensors and switches. Examples of the sensors and switches connecting with the control unit 90 include an accelerator pedal position sensor 65a that measures the actuating amount of an accelerator pedal 65 and a gearshift position sensor 66a that detects the position of a gearshift lever 66.

The control unit 90 is further connected to the EFIECU 70 via a communication line and transmits various pieces of information to and from the EFIECU 70 through communications. The control unit 90 outputs required pieces of information for the control of the engine 50 to the EFIECU 70 and thereby indirectly controls the engine 50. The control unit 90, on the other hand, inputs required pieces of information, such as the revolving speed of the engine 50, from the EFIECU 70.

In the power output apparatus 10 shown in FIG. 1, the clutch motor 30 is applied for the power regulation unit that regulates the power output from the engine 150 with the input and output of electric power and transmits the regulated power. The distribution of the power is implemented by the sliding motions between the inner rotor 32 and the outer rotor 34 in the clutch motor 30. Part of the power output from the engine 50 is directly output in a mechanical form to the outer rotor shaft 35 via the clutch motor 30. Another part of the power is taken out of the clutch motor 30 in the form of electric power by the sliding rotations of the two rotors 32 and 34 in the clutch motor 30. The energy taken out in the electrical form may be accumulated in the battery 94 or alternatively output to the other motor, that is, the assist motor 40, so as to increase the torque of the outer rotor shaft 35 functioning as the drive shaft. The power output apparatus 10 thus freely controls the power output to the outer rotor shaft 35 by utilizing the engine 50 that outputs power, the clutch motor 30 that transmits power via the sliding rotations, and the assist motor 40 that carries out both the power operation and the regenerative operation.

(2) General Operation

The following describes the general operation of the power output apparatus 10 of the embodiment, that is, the operation of converting the power output from the engine 50 to a required combination of the revolving speed and the torque and outputting the converted power to the drive shaft or the outer rotor shaft 35. In the power output apparatus 10 of the embodiment, the pathway of conversion depends upon the relationship between a revolving speed Ne of the engine 50 and a revolving speed Nd of the outer rotor shaft 35 and upon the state of linkage of the rotor shaft 43 of the assist motor 40.

Figure 4:
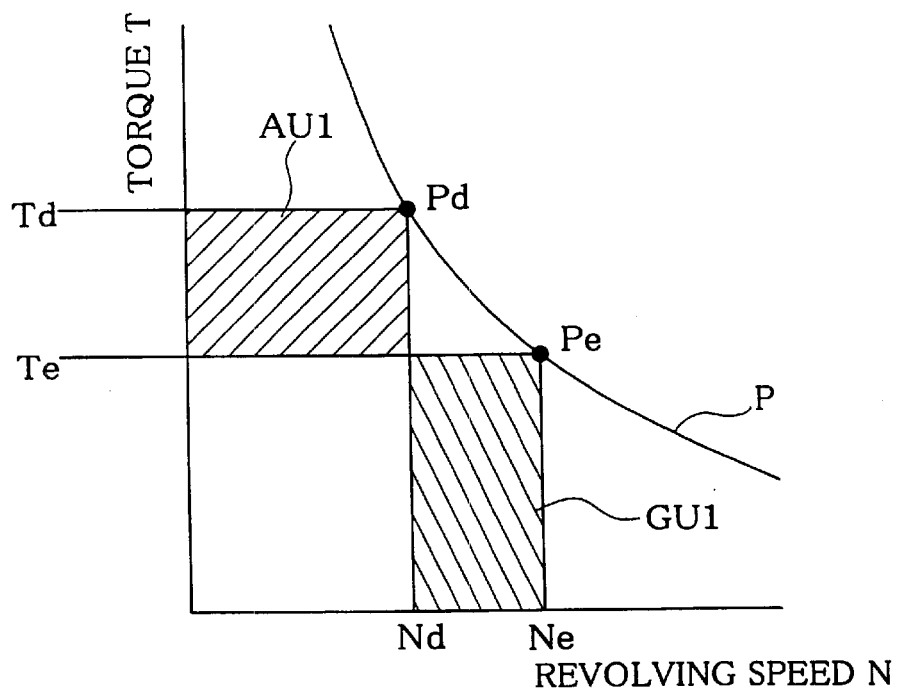
FIG. 4 is a graph showing a process of converting the power output from an engine 50 of the power output apparatus 10 into a combination of a lower revolving speed and a higher torque in the state of under drive linkage.

In the state of under drive linkage shown in FIG. 2, in one case, the revolving speed Nd of the outer rotor shaft 35 is lower than the revolving speed Ne of the engine 50. The process of torque conversion in this case is shown in FIG. 4. Data in the graph of FIG. 4 are plotted with the torque T as ordinate and the revolving speed N as abscissa, where Pe and Pd respectively denote a working point of the engine 50 and a working point of the outer rotor shaft 35. A curve P shown in FIG. 4 represents an equivalent power curve on which the product of the revolving speed and the torque is constant. In this example, the power Pe output from the engine 50 and defined by the revolving speed Ne and a torque Te is converted to the power Pd defined by the revolving speed Nd, which is lower than the revolving speed Ne, and a torque Td, which is greater than the torque Te, and output to the outer rotor shaft 35.

In the case of torque conversion shown in FIG. 4, the revolving speed Nd of the outer rotor shaft 35 is lower than the revolving speed Ne of the engine 50. In the clutch motor 30, the outer rotor 34 rotates at the revolving speed Nd whereas the inner rotor 32 rotates at the higher revolving speed Ne. The clutch motor 30 thus has reverse rotations and a negative revolving speed Nc. A torque Tc of the clutch motor 30 has a positive value that is identical with the output torque Te of the engine 50, based on the principle of action and reaction. The clutch motor 30 is accordingly driven to transmit part of the power output from the engine 50 to the outer rotor shaft 35 functioning as the drive shaft, while causing the residual part of the power to be regenerated as electric power. The regenerated electric power is identical with the product of the revolving speed Nc and the torque Tc of the clutch motor 30, which is equal to an area GU1 hatched in the graph of FIG. 4.

Figure 13:
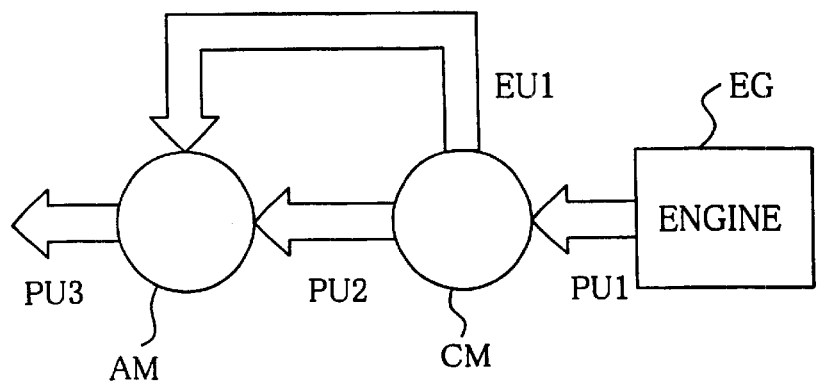
FIG. 13 shows transmission of power in the state of under drive operation when an assist motor is linked with a drive shaft in a prior art power output apparatus.

The torque Td of the outer rotor shaft 35 is greater than the torque Te of the engine 50. The assist motor 40 is accordingly driven with a positive torque Ta and a positive revolving speed Na. Namely the assist motor 40 receives a supply of electric power and carries out the power operation. The supply of electric power is identical with the product of the revolving speed Na and the torque Ta of the assist motor 40, which is equal to an area AU1 hatched in the graph of FIG. 4. Upon the assumption that both the clutch motor 30 and the assist motor 40 have a driving efficiency of 100%, the electric power regenerated by the clutch motor 30 is equal to the electric power supplied to the assist motor 40. The clutch motor 30 takes out the energy corresponding to the area GU1 in the form of electric power and supplies the electric power as the energy corresponding to the area AU1. This enables the power defined by the working point Pe of the engine 50 to be converted to the state of the working point Pd. The driving efficiency of the clutch motor 30 and the assist motor 40 is not equal to 100% in the actual state. The conversion is accordingly carried out by supplying a deficiency of electric power from the battery 94 or causing the engine 50 to output an excess power corresponding to a possible loss. As described previously with the drawing of FIG. 13, the conversion enables the electric power regenerated by the clutch motor 30 at the upstream position to be supplied to the assist motor 40 at the downstream position.

Figure 5:
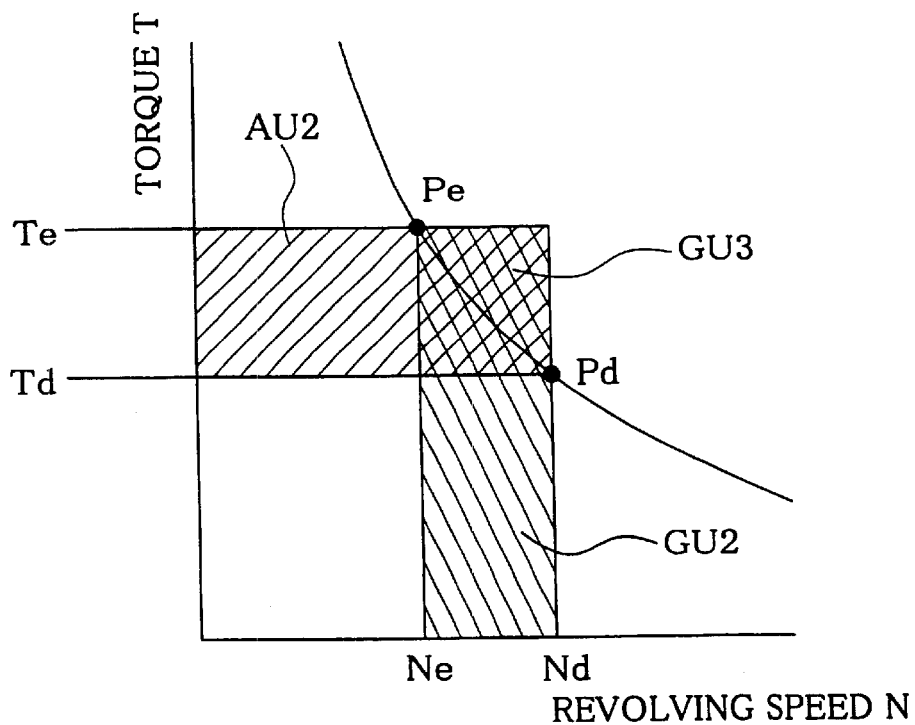
FIG. 5 is a graph showing a process of converting the power output from the engine 50 of the power output apparatus 10 into a combination of a higher revolving speed and a lower torque in the state of under drive linkage.
Figure 14:
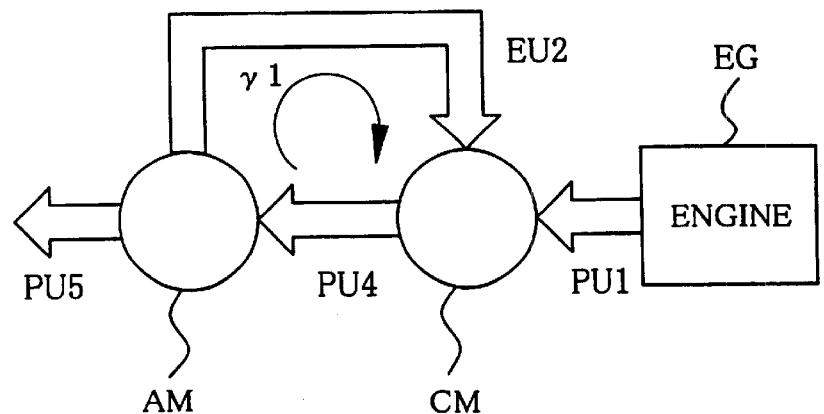
FIG. 14 shows transmission of power in the state of over drive operation when an assist motor is linked with the drive shaft in the prior art power output apparatus.

In the state of under drive linkage shown in FIG. 2, in another case, the revolving speed Nd of the outer rotor shaft 35 is higher than the revolving speed Ne of the engine 50. The process of torque conversion in this case is shown in FIG. 5. In the case of torque conversion shown in FIG. 5, the revolving speed Nd of the outer rotor shaft 35 is higher than the revolving speed Ne of the engine 50. The clutch motor 30 is accordingly driven with a positive revolving speed Nc and a positive torque Tc. Namely the clutch motor 30 receives a supply of electric power and carries out the power operation. The supply of electric power is identical with the product of the revolving speed Nc and the torque Tc of the clutch motor 30, which is equal to the sum of areas GU2 and GU3 hatched in the graph of FIG. 5. The torque Td of the outer rotor shaft 35 is smaller than the torque Te of the engine 50. The assist motor 40 is accordingly driven with a negative torque Ta and a positive revolving speed Na. Namely the assist motor 40 carries out the regenerative operation. The regenerated electric power is identical with the revolving speed Na and the torque Ta of the assist motor 40, which is equal to the sum of areas AU2 and GU3 hatched in the graph of FIG. 5. Upon the assumption that both the clutch motor 30 and the assist motor 40 have a driving efficiency of 100%, the electric power regenerated by the assist motor 40 is equal to the electric power supplied to the clutch motor 30. As described previously with the drawing of FIG. 14, the conversion enables the electric power regenerated by the assist motor 40 at the downstream position to be supplied to the clutch motor 30 at the upstream position, thereby generating the circulation of power.

In the state of under drive linkage, the working points of the assist motor 40 and the clutch motor 30 to realize the above conversions are given as:

$$\text{Revolving speed } Nc \text{ of clutch motor } 30 = Nd - Ne \quad (1)$$

$$\text{Torque } Tc \text{ of clutch motor } 30 = Te$$

$$\text{Revolving speed } Na \text{ of assist motor } 40 = Nd$$

$$\text{Torque } Ta \text{ of assist motor } 40 = Td - Te$$

Figure 6:
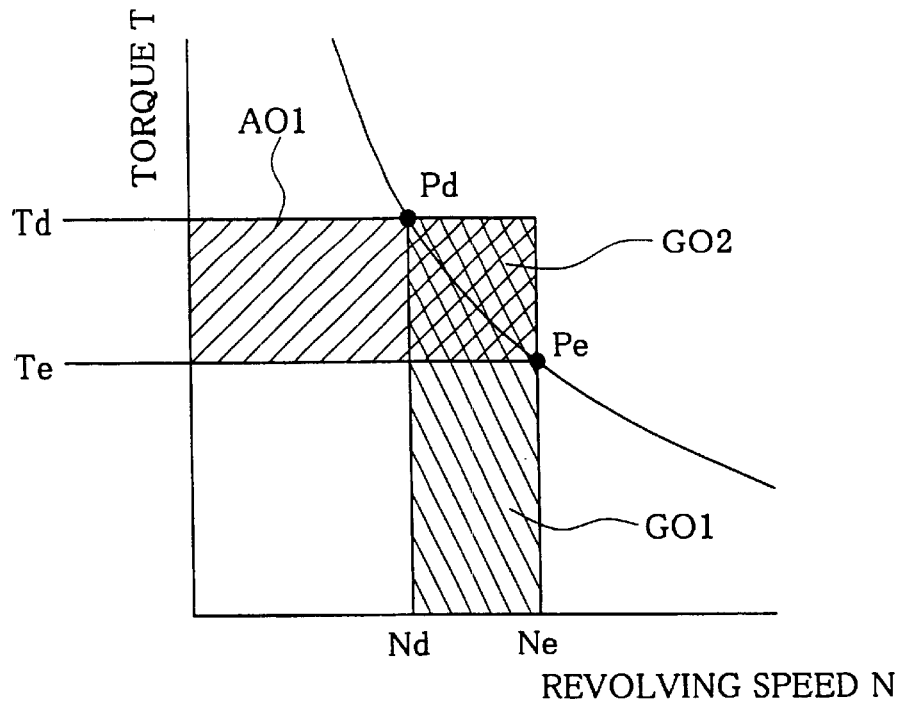
FIG. 6 is a graph showing a process of converting the power output from the engine 50 of the power output apparatus 10 into a combination of a lower revolving speed and a higher torque in the state of over drive linkage.
Figure 15:
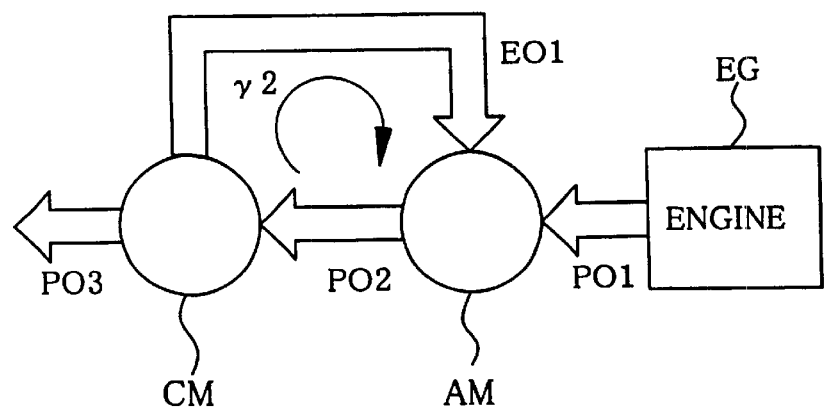
FIG. 15 shows transmission of power in the state of under drive operation when the assist motor is linked with an output shaft in the prior art power output apparatus.

In the state of over drive linkage shown in FIG. 3, in one case, the revolving speed Nd of the outer rotor shaft 35 is lower than the revolving speed Ne of the engine 50. The process of torque conversion in this case is shown in FIG. 6. In the case of torque conversion shown in FIG. 6, the revolving speed Nd of the outer rotor shaft 35 is lower than the revolving speed Ne of the engine 50. The clutch motor 30 is accordingly driven with a negative revolving speed Nc and a positive torque Tc. Namely the clutch motor 30 carries out the regenerative operation. The regenerated electric power is identical with the product of the revolving speed Nc and the torque Tc of the clutch motor 30, which is equal to the sum of areas GO1 and GO2 hatched in the graph of FIG. 6. The torque Td of the outer rotor shaft 35 is greater than the torque Te of the engine 50. The assist motor 40 is accordingly driven with a positive torque Ta and a positive revolving speed Na. Namely the assist motor 40 receives a supply of electric power and carries out the power operation. The supply of electric power is identical with the revolving speed Na and the torque Ta of the assist motor 40, which is equal to the sum of areas AO1 and GO2 hatched in the graph of FIG. 6. Upon the assumption that both the clutch motor 30 and the assist motor 40 have a driving efficiency of 100%, the electric power regenerated by the clutch motor 30 is equal to the electric power supplied to the assist motor 40. As described previously with the drawing of FIG. 15, the conversion enables the electric power regenerated by the clutch motor 30 at the downstream position to be supplied to the assist motor 40 at the upstream position, thereby generating the circulation of power.

Figure 7:
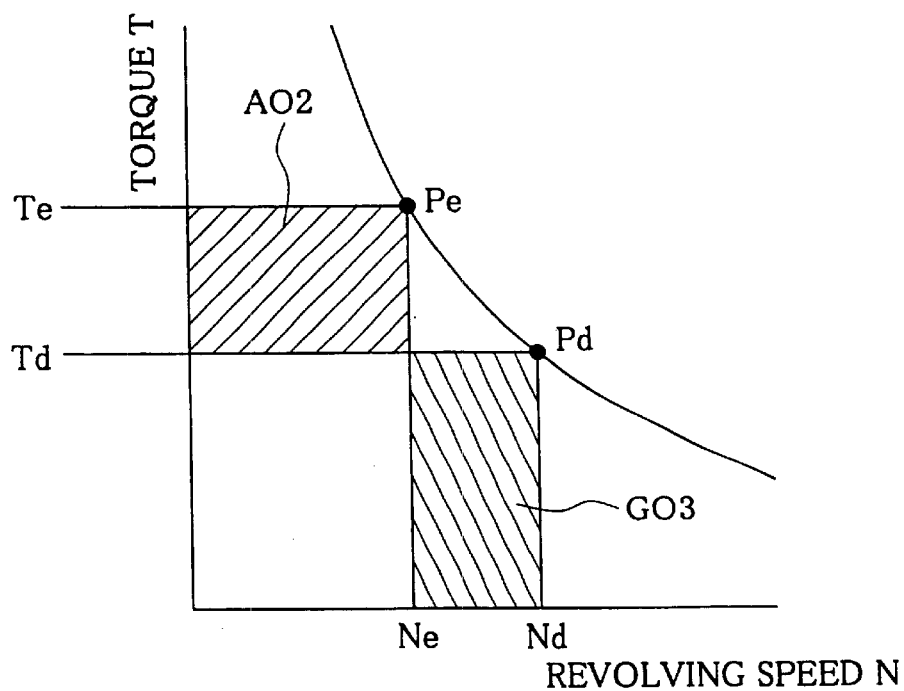
FIG. 7 is a graph showing a process of converting the power output from the engine 50 of the power output apparatus 10 into a combination of a higher revolving speed and a lower torque in the state of over drive linkage.
Figure 16:
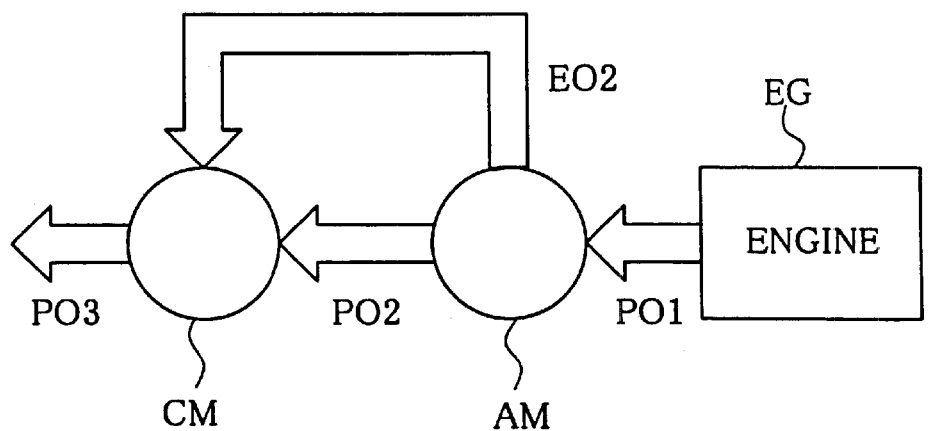
FIG. 16 shows transmission of power in the state of over drive operation when the assist motor is linked with the output shaft in the prior art power output apparatus.

In the state of over drive linkage shown in FIG. 3, in another case, the revolving speed Nd of the outer rotor shaft 35 is higher than the revolving speed Ne of the engine 50. The process of torque conversion in this case is shown in FIG. 7. In the case of torque conversion shown in FIG. 7, the revolving speed Nd of the outer rotor shaft 35 is higher than the revolving speed Ne of the engine 50. The clutch motor 30 is accordingly driven with a positive revolving speed Nc and a positive torque Tc. Namely the clutch motor 30 receives a supply of electric power and carries out the power operation. The supply of electric power is identical with the product of the revolving speed Nc and the torque Tc of the clutch motor 30, which is equal to an area GO3 hatched in the graph of FIG. 7. The torque Td of the outer rotor shaft 35 is smaller than the torque Te of the engine 50. The assist motor 40 is accordingly driven with a negative torque Ta and a positive revolving speed Na. Namely the assist motor 40 carries out the regenerative operation. The regenerated electric power is identical with the revolving speed Na and the torque Ta of the assist motor 40, which is equal to an area AO2 hatched in the graph of FIG. 7. Upon the assumption that both the clutch motor 30 and the assist motor 40 have a driving efficiency of 100%, the electric power regenerated by the assist motor 40 is equal to the electric power supplied to the clutch motor 30. As described previously with the drawing of FIG. 16, the conversion enables the electric power regenerated by the assist motor 40 at the upstream position to be supplied to the clutch motor 30 at the downstream position.

In the state of over drive linkage, the working points of the assist motor 40 and the clutch motor 30 to realize the above conversions are given as:

$$\text{Revolving speed } Nc \text{ of clutch motor } 30 = Nd - Ne \quad (2)$$

$$\text{Torque } Tc \text{ of clutch motor } 30 = Td$$

$$\text{Revolving speed } Na \text{ of assist motor } 40 = Ne$$

$$\text{Torque } Ta \text{ of assist motor } 40 = Td - Te$$

As described above, the power output apparatus 10 of the embodiment converts the power output from the engine 50 to a required combination of the revolving speed and the torque and outputs the converted power to the outer rotor shaft 35 functioning as the drive shaft, according to the relationship between the revolving speed Ne of the engine 50 and the revolving speed Nd of the outer rotor shaft 35 and the state of linkage of the rotor shaft 43 of the assist motor 40.

In the state of under drive linkage under the over drive condition that the revolving speed Nd of the outer rotor shaft 35 is higher than the revolving speed Ne of the engine 50, the power circulation occurs to lower the driving efficiency of the vehicle. In the state of over drive linkage under the under drive condition that the revolving speed Nd of the outer rotor shaft 35 is lower than the revolving speed Ne of the engine 50, the power circulation also occurs to lower the driving efficiency of the vehicle. In order to improve the driving efficiency, the state of linkage of the rotor shaft 43 of the assist motor 40 should be set to the state of over drive linkage under the over drive condition that the revolving speed Nd of the outer rotor shaft 35 is higher than the revolving speed Ne of the engine 50. Similarly the state of linkage of the rotor shaft 43 of the assist motor 40 should be set to the state of under drive linkage under the under drive condition that the revolving speed Nd of the outer rotor shaft 35 is lower than the revolving speed Ne of the engine 50. The boundary where the revolving speed Ne of the engine 50 is equal to the revolving speed Nd of the outer rotor shaft 35 represents the performance line of the engine 50, which is used to determine the working point of the engine 50.

(3) Selection of Performance Line and Changing of State of Linkage

Figure 8:
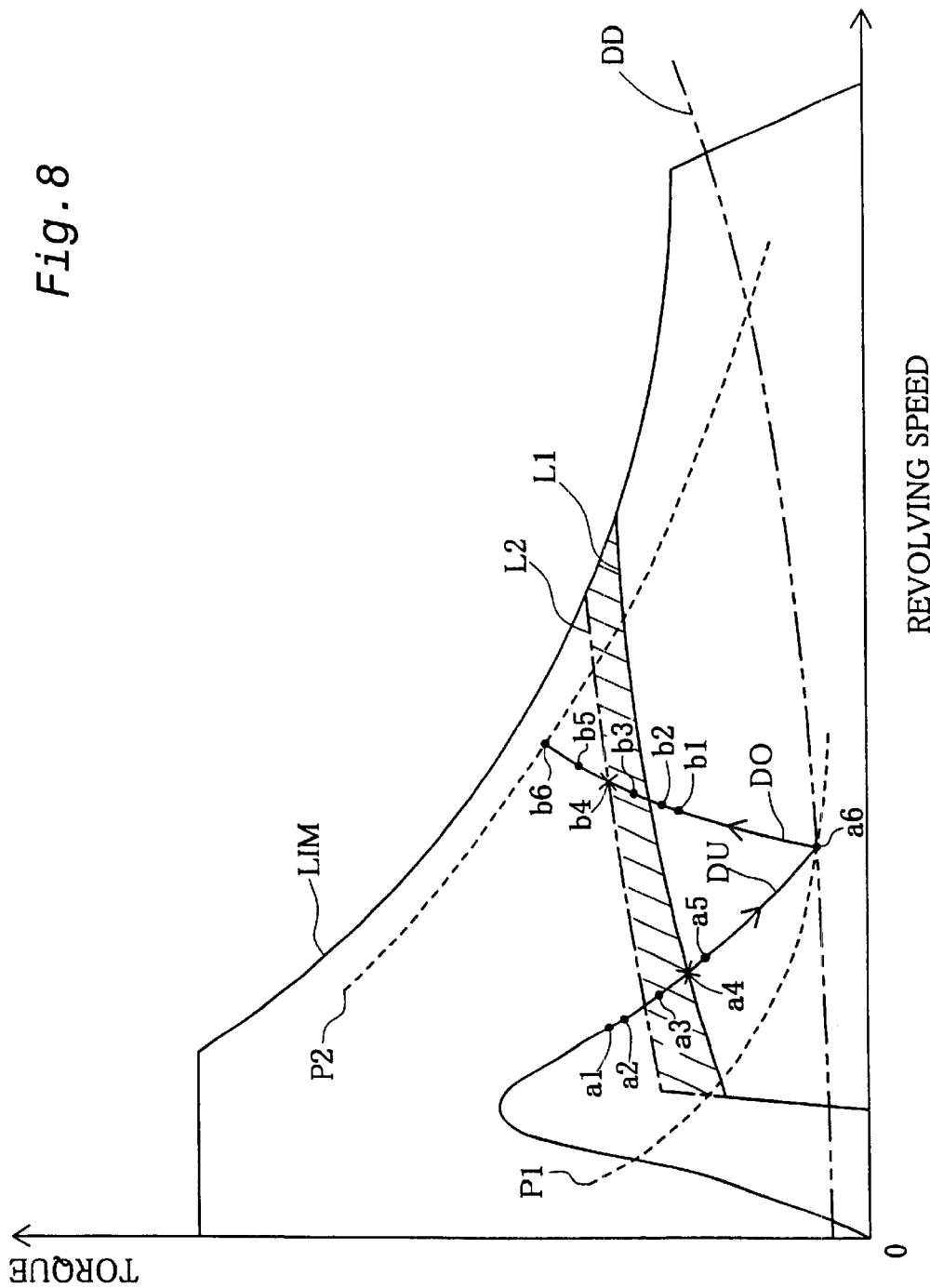
FIG. 8 shows a relationship between the working point of an outer rotor shaft 35 functioning as a drive shaft and the performance line of the engine 50 in the power output apparatus 10 of the embodiment.

FIG. 8 shows the relationship between the working point of the outer rotor shaft 35 functioning as the drive shaft and the performance line of the engine 50. The data in the graph of FIG. 8 are plotted with the torque as ordinate and the revolving speed as abscissa. The graph of FIG. 8 shows the working characteristics of the power output apparatus 10 of the embodiment.

In the graph of FIG. 8, curves L1 and L2 represent performance lines that are used to determine the working point of the engine 50. The working point of the engine 50 is expressed as the combination of the torque and the speed of the engine 50. The control unit 90 determines the working point of the engine 50 along either one of the performance lines L1 and L2, according to the state of linkage of the rotor shaft 43 of the assist motor 40 and the position of the working point of the outer rotor shaft 35 as described later in detail. The performance line L1 attains the highest efficiency of the engine 50. Determining the working point of the engine 50 along the performance line L1 ensures the optimum fuel consumption of the engine 50. The performance line L1 is thus hereinafter referred to as the optimum fuel consumption line. The other performance line L2 attains the maximum torque output from the engine 50 and corresponds to the performance line obtained when the throttle valve 53 of the engine 50 is set in a wide open position. The performance line L2 is thus hereinafter referred to as the wide open throttle line or WOT line. These two performance lines L1 and L2 are experimentally obtained and stored in advance in the form of maps in the ROM included in the control unit 90.

In the graph of FIG. 8, a curve LIM represents a maximum output line of the power output apparatus 10 of the embodiment. An area defined by the torque axis (ordinate), the revolving speed axis (abscissa), and the curve LIM is a working area in which the working point of the outer rotor shaft 35 functioning as the drive shaft is present, that is, a workable area of the power output apparatus 10. A curve DD represents a line having a running resistance of 0%.

In this embodiment, the two performance lines, that is, the optimum fuel consumption line L1 and the WOT line L2 are used as the performance line of the engine 50 as described above. In principle, in an area of lower torque than the optimum fuel consumption line L1, the state of linkage of the rotor shaft 43 of the assist motor 40 is set to the state of over drive linkage. In an area of higher torque than the WOT line L2, on the other hand, the state of linkage of the rotor shaft 43 of the assist motor 40 is set to the state of under drive linkage. In an area of higher torque than the optimum fuel consumption line L1 and of lower torque than the WOT line L2 (that is, an area defined by the optimum fuel consumption line L1 and the WOT line L2 and hatched in the graph of FIG. 8), the state of linkage of the rotor shaft 43 of the assist motor 40 is set to the state of over drive linkage in one case and to the state of under drive linkage in another case, as described later in detail.

In the graph of FIG. 8, curves DU and DO represent loci of the working point of the outer rotor shaft 35 functioning as the drive shaft. The working point of the outer rotor shaft 35 is expressed as the combination of the torque and the revolving speed of the outer rotor shaft 35. This is equivalent to the output working point of the power output apparatus 10. The curve DU represents the locus of the working point of the outer rotor shaft 35 in the case where the torque output from the outer rotor shaft 35 or the drive shaft becomes greater than the 0% running resistance line DD to accelerate the vehicle. As the vehicle accelerates, the torque decreases to run the vehicle in the stationary state at a certain speed that causes the output torque of the outer rotor shaft 35 to balance with the 0% running resistance line DD. The curve DO represents the locus of the working point of the outer rotor shaft 35 in the case where the driver actuates the accelerator pedal 65 in the stationary driving condition of the vehicle, so as to increase the output torque of the outer rotor shaft 35 and accelerate the vehicle.

The operation of the power output apparatus 10 of the embodiment is described in detail when the working point of the outer rotor shaft 35 moves along the curve DO in one example and along the curve DU in another example.

Figure 9:
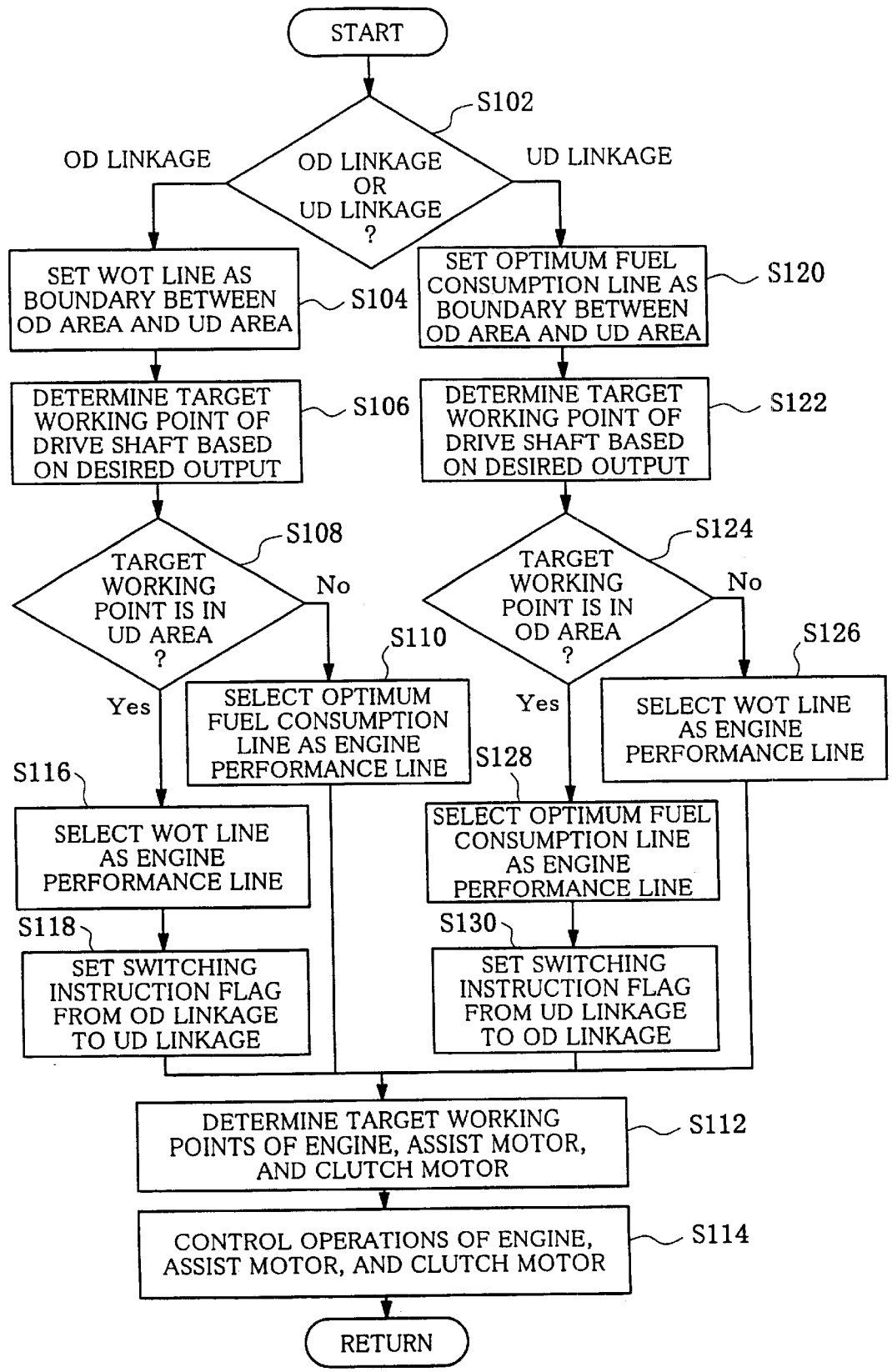
FIG. 9 is a flowchart showing a processing routine of controlling operations of the engine 50, an assist motor 40, and a clutch motor 30 in the power output apparatus 10 of the embodiment.
Figure 10:
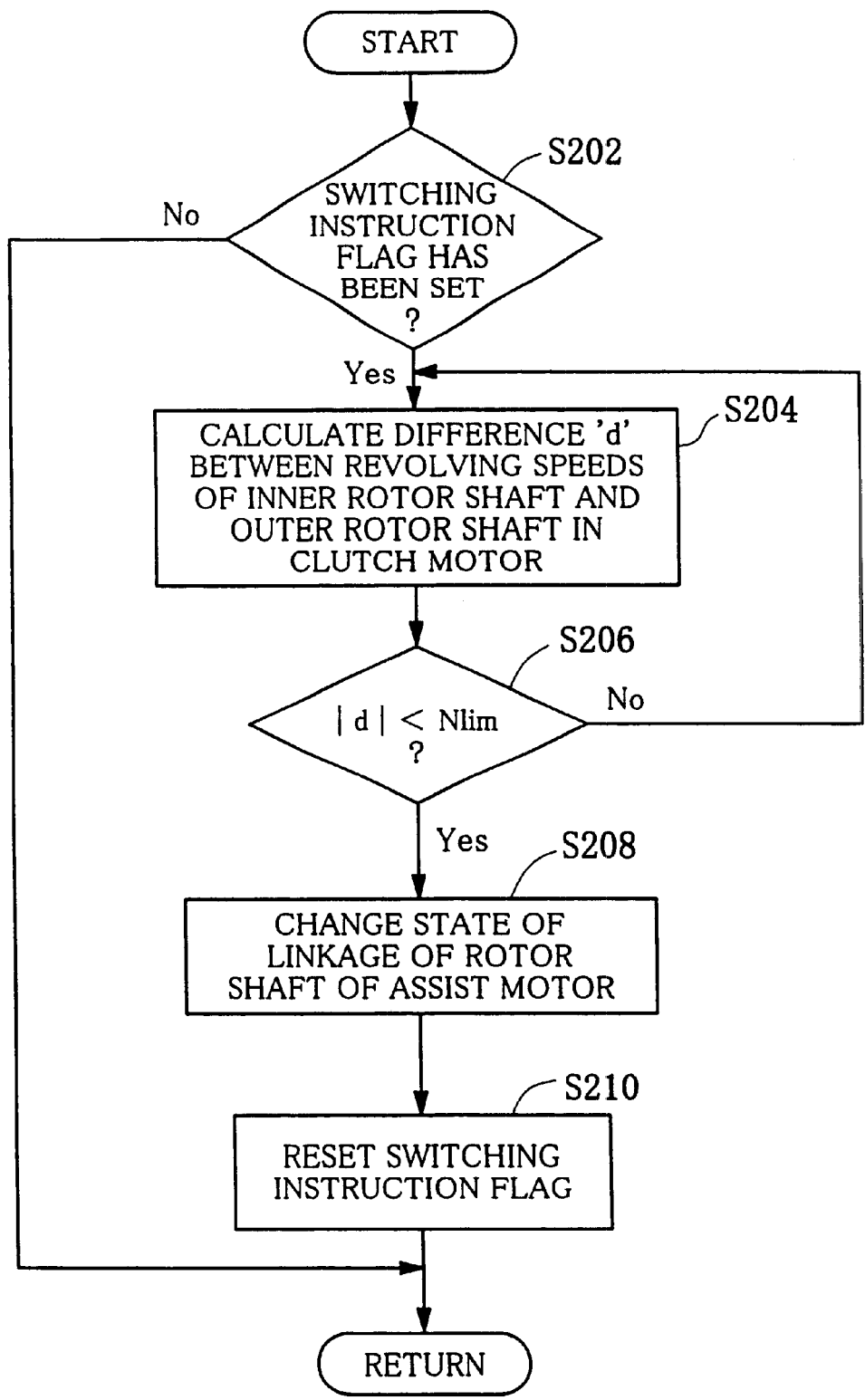
FIG. 10 is a flowchart showing a processing routine of changing the state of linkage of a rotor shaft 43 of the assist motor 40 in the power output apparatus 10 of the embodiment.

FIG. 9 is a flowchart showing a processing routine of controlling the operations of the engine 50, the assist motor 40, and the clutch motor 30 in this embodiment. FIG. 10 is a flowchart showing a processing routine of changing the state of linkage of the rotor shaft 43 of the assist motor 40 in this embodiment. These processing routines are independently and repeatedly executed at predetermined time intervals by the CPU in the control unit 90, which is activated according to the processing programs stored in the ROM.

In the first example, the working point of the outer rotor shaft 35 moves along the curve DO. Here it is assumed that the working point of the outer rotor shaft 35 is currently positioned at a point b1 on the curve DO in the graph of FIG. 8. This means that the working point of the outer rotor shaft 35 is present in the area of lower torque than the optimum fuel consumption line L1. The current state of linkage of the rotor shaft 43 of the assist motor 40 is accordingly set to the state of over drive linkage.

When the program enters the processing routine of FIG. 9, the control unit 90 first determines whether the current state of linkage of the rotor shaft 43 of the assist motor 40 is set to the state of over drive linkage or to the state of under drive linkage at step S102. As described previously, the control unit 90 drives the actuator 86 and changes the destination of linkage of the rotor shaft 43 of the assist motor 40. The control unit 90 thus always seizes the current state of linkage of the rotor shaft 43 of the assist motor 40. The control unit 90 carries out the determination according to the seized current state at step S102.

As described previously, when the working point of the outer rotor shaft 35 is positioned at the point b1, the rotor shaft 43 of the assist motor 40 is set in the state of over drive linkage. The control unit 90 accordingly determines that the current state of linkage of the rotor shaft 43 of the assist motor 40 is set to the state of over drive linkage at step S102, and sets the WOT line L2 as the boundary between an over drive area and an under drive area at step S104.

The over drive area here represents the area in which the rotor shaft 43 of the assist motor 40 should be set in the state of over drive linkage in the workable area of the power output apparatus 10 shown in the graph of FIG. 8. Similarly the under drive area represents the area in which the rotor shaft 43 of the assist motor 40 should be set in the state of under drive linkage. As described above, the state of over drive linkage is set in the area of lower torque than the optimum fuel consumption line L1. Namely this area is included in the over drive area. The state of under drive linkage is set in the area of higher torque than the WOT line L2. Namely this area is included in the under drive area. The area of higher torque than the optimum fuel consumption line L1 and of lower torque than the WOT line L2 is an indeterminate area where either one of the state of over drive linkage and the state of under drive linkage is set according to the circumstances. It is thus required to determine whether this indeterminate area is included in the over drive area or in the under drive area. The processing of step S104 or step S120 (described later) sets the boundary between the over drive area and the under drive area, so as to determine whether the indeterminate area is included in the over drive area or in the under drive area.

The processing of step S104 sets the WOT line L2 as the boundary between the over drive area and the under drive area, so as to determine that the indeterminate area is included in the over drive area.

The control unit 90 subsequently obtains a desired output required by the driver, based on the actuating amount of the accelerator pedal 65 measured by the accelerator pedal position sensor 65a, and determines a target working point of the outer rotor shaft 35 functioning as the drive shaft according to the desired output at step S106. The desired output corresponds to a power to be output from the outer rotor shaft 35 and is expressed as the product of a target revolving speed and a target torque of the outer rotor shaft 35. The target working point of the outer rotor shaft 35 is thus determined as a combination of the target revolving speed and the target torque of the outer rotor shaft 35.

The control unit 90, more specifically the area determination unit 90b included in the control unit 90, then determines whether or not the target working point of the outer rotor shaft 35 functioning as the drive shaft is present in the under drive area at step S108.

The working point of the outer rotor shaft 35 is currently positioned at the point b1 as described previously. When the target working point of the outer rotor shaft 35 is positioned, for example, at a point b2 or at a point b3 (see FIG. 8), which is included in the over drive area, the program proceeds to step S110. The control unit 90, more specifically the performance line selection unit 90a and the controller 90c included in the control unit 90, selects the optimum fuel consumption line L1 out of the two performance lines L1 and L2 as the performance line of the engine 50 at step S110. In the case where the current state of linkage of the rotor shaft 43 of the assist motor 40 is set to the state of over drive linkage and the target working point of the outer rotor shaft 35 is present in the over drive area, the selected performance line of the engine 50 is the optimum fuel consumption line L1 where the highest efficiency of the engine 50 attains.

After selecting the performance line of the engine 50, the control unit 90 determines a target working point of the engine 50 along the selected performance line of the engine 50 and subsequently determines target working points of the assist motor 40 and the clutch motor 30, based on the target working point of the engine 50 at step S112. The concrete procedure of the determination at step S112 is described below.

The control unit 90 first calculates a charge-discharge electric power and an auxiliary machine-driving electric power, adds the results of the calculation to the desired output required by the driver, which is obtained at step S106, and determines the sum as a required power to the engine 50. The charge-discharge electric power represents an energy required for charging or discharging the battery 94. The charge-discharge electric power has a positive value in the case where the battery 94 needs charging, and has a negative value in the case where the battery 94 needs discharging. The auxiliary machine-driving electric power represents an energy required for driving auxiliary machines, such as an air conditioner. The term 'energy' used in the specification hereof implies the energy per unit time. In this sense, the mechanical energy is synonymous with the power, and the electrical energy is synonymous with the electric power.

The control unit 90 then finds a specific point, which corresponds to the required power to the engine 50 thus determined, on the selected performance line of the engine 50 and determines the target working point of the engine 50. The required power to the engine 50 is expressed as the product of a target speed and a target torque of the engine 50. The specific point on the performance line of the engine 50 where the product of the revolving speed and the torque is equal to the value of the required power accordingly denotes the target working point of the engine 50. One concrete procedure reads a working point corresponding to the required power to the engine 50 from the map of the selected performance line (the optimum fuel consumption line L1 in this example) out of the two maps stored in the ROM included in the control unit 90, so as to determine the target working point of the engine 50.

The control unit 90 subsequently determines the target working points of the assist motor 40 and the clutch motor 30, that is, the target revolving speeds and the target torques of the assist motor 40 and the clutch motor 30, according to either Equations (1) or Equations (2) given above, based on the target working point of the engine 50 determined in the above manner. Using which of Equations (1) and Equations (2) depends upon the current state of linkage of the rotor shaft 43 of the assist motor 40. Equations (1) are used in the case of the state of under drive linkage, and Equations (2) are used in the case of the state of over drive linkage. Since the rotor shaft 43 of the assist motor 40 is currently in the state of over drive linkage, Equations (2) are used for the determination.

At subsequent step S114, the control unit 90 controls the operations of the engine 50, the assist motor 40, and the clutch motor 30, based on the respective target working points of the engine 50, the assist motor 40, and the clutch motor 30 thus determined. Any known process of controlling synchronous motors is applied to control the operations of the clutch motor 30 and the assist motor 40. In this embodiment, the proportional integral control procedure is applied for the control. This procedure measures the current torque of each motor and sets voltage command values applied to the respective phases, based on a difference of the observed torque from the target torque and the target revolving speed. The value of each voltage to be applied is defined by the proportional term, the integral term, and the summation term of the difference. Appropriate values are experimentally or in another way set to proportional coefficients applied for the respective terms. The voltages set in the above manner are converted to switching duties of the transistor inverters constituting the first and second driving circuits 91 and 92 and then applied to the respective motors 30 and 40 through PWM control.

The control unit 90 controls the switching operations of the first and second driving circuits 91 and 92 and thereby directly controls the operations of the clutch motor 30 and the assist motor 40. The EFIECU 70 is, on the other hand, actually in charge of the process of controlling the operation of the engine 50. The control unit 90 accordingly outputs information regarding the working point of the engine 50 to the EFIECU 70, so as to indirectly control the operation of the engine 50.

In another case, the working point of the outer rotor shaft 35 is currently positioned at the point b1 and the target working point of the outer rotor shaft 35 is positioned at a point b5 (see FIG. 8), which is included in the under drive area. In this case, the control unit 90 determines that the target working point of the outer rotor shaft 35 is present in the under drive area at step S108 and selects the WOT line L2 out of the two performance lines L1 and L2 as the performance line of the engine 50 at step S116. In the case where the current state of linkage of the rotor shaft 43 of the assist motor 40 is set to the state of over drive linkage and the target working point of the outer rotor shaft 35 is present in the under drive area, the selected performance line of the engine 50 is the WOT line L2 where the maximum output of the engine 50 attains.

The control unit 90 subsequently sets a switching instruction flag, in order to change the state of linkage of the rotor shaft 43 of the assist motor 40 from the state of over drive linkage to the state of under drive linkage at step S118. The switching instruction flag is used in the process of changing the state of linkage of the rotor shaft 43 of the assist motor 40 discussed below.

At step S112, the control unit 90 determines the target working point of the engine 50 using the WOT line L2 selected as the performance line of the engine 50, and subsequently determines the target working points of the assist motor 40 and the clutch motor 30 based on the target working point of the engine 50 thus determined. The control unit 90 controls the operations of the engine 50, the assist motor 40, and the clutch motor 30, based on the respective target working points of the engine 50, the assist motor 40, and the clutch motor 30 at step S114. The details of the processing carried out at steps S112 and S114 are discussed above.

The processing routine of FIG. 10 starts in parallel with the processing routine of FIG. 9. When the program enters the processing routine of FIG. 10, the control unit 90 first determines whether or not the switching instruction flag has been set at step S202. When the result of the determination shows that the switching instruction flag has not been set, the program immediately exits from the processing routine of FIG. 10. Otherwise, that is, when it is determined that the switching instruction flag has been set, the program executes the processing of and after step S204.

In this example, since the switching instruction flag has been set at step S118 in the processing routine of FIG. 9, the control unit 90 calculates a difference 'd' between the revolving speed of the inner rotor shaft 33 and the revolving speed of the outer rotor shaft 35 in the clutch motor 30 at step S204. The control unit 90 then determines whether the calculated difference 'd' in revolving speed is present in a predetermined range, that is, −Nlim<d<Nlim, or out of the predetermined range at step S206.

When the difference 'd' between the revolving speed of the inner rotor shaft 33 and the revolving speed of the outer rotor shaft 35 in the clutch motor 30 is closer to zero, the linkage switching mechanism 80 can more smoothly change the state of linkage of the rotor shaft 43 of the assist motor 40 from the state of over drive linkage (that is, in the state where the rotor shaft 43 is linked with the inner rotor shaft 33 of the clutch motor 30) to the state of under driver linkage (that is, in the state where the rotor shaft 43 is linked with the outer rotor shaft 35 of the clutch motor 30). The procedure of this embodiment sets the predetermined value Nlim in advance, in order to make the predetermined range (−Nlim<d<Nlim) substantially equal to the smoothly changeable area.

When the difference 'd' between the revolving speeds of the inner rotor shaft 33 and the outer rotor shaft 35 in the clutch motor 30 is out of the predetermined range (−Nlim≧d or d≧Nlim), the control unit 90 returns to step S204 and waits until the difference 'd' becomes within the predetermined range.

Since the WOT line L2 has been selected as the performance line of the engine 50 at step S116 in the flowchart of FIG. 9, the working point of the engine 50 gradually moves on the WOT line L2. The working point of the outer rotor shaft 35, on the other hand, gradually moves on the curve DO from the point b1 towards the point b5 (target working point) shown in FIG. 8. When the working point of the outer rotor shaft 35 reaches an intersection b4 of the WOT line L2 selected as the performance line of the engine 50 and the curve DO, which represents the locus of the working point of the outer rotor shaft 35, the working point of the engine 50 also reaches the intersection b4. Namely the working point of the outer rotor shaft 35 becomes coincident with the working point of the engine 50. At this moment, the revolving speed of the engine 50 becomes identical with the revolving speed of the outer rotor shaft 35, and the revolving speed of the inner rotor shaft 33 becomes identical with the revolving speed of the outer rotor shaft 35 in the clutch motor 30. The difference 'd' in revolving speed in the clutch motor 30 is accordingly equal to zero.

While the working point of the engine 50 moves along the WOT line L2 to approach the intersection b4 and the working point of the outer rotor shaft 35 moves along the curve DO to approach the intersection b4, the difference 'd' between the revolving speeds of the inner rotor shaft 33 and the outer rotor shaft 35 in the clutch motor 30 becomes within the predetermined range (−Nlim<d<Nlim). When the difference 'd' in revolving speed is within the predetermined range (−Nlim<d<Nlim), the control unit 90 drives the actuator 86 and changes the state of linkage of the rotor shaft 43 of the assist motor 40 from the state of over drive linkage to the state of under drive linkage at step S208. The control unit 90 then resets the switching instruction flag at step S210 and exits from the processing routine of FIG. 10.

In this manner, when the working point of the outer rotor shaft 35 moves along the curve DO from the point b1 to the intersection b4, the state of linkage of the rotor shaft 43 of the assist motor 40 is changed from the state of over drive linkage to the state of under drive linkage.

Here it is assumed that the program enters again the processing routine shown in the flowchart of FIG. 9, while the working point of the outer rotor shaft 35 moves from the intersection b4 to the point b5. The control unit 90 first determines whether the current state of linkage of the rotor shaft 43 of the assist motor 40 is set to the state of over drive linkage or to the state of under drive linkage at step S102 as described previously. Since the state of linkage of the rotor shaft 43 has been changed from the state of over drive linkage to the state of under drive linkage, the control unit 90 determines at this moment that the rotor shaft 43 of the assist motor 40 is set in the state of under drive linkage at step S102 and sets the optimum fuel consumption line L1 as the boundary between the over drive area and the under drive area at step S120.

Like the processing of step S106, the control unit 90 obtains the desired output required by the driver and determines the target working point of the outer rotor shaft 35 functioning as the drive shaft, based on the desired output at step S122. The control unit 90, more specifically the area determination unit 90b included in the control unit 90, determines whether or not the target working point of the outer rotor shaft 35 thus determined is present in the over drive area at step S124. When the working point of the outer rotor shaft 35 is positioned at the point b5 and the target working point of the outer rotor shaft 35 is positioned, for example, at a point b6 (see FIG. 8), which is within the under drive area, the program proceeds to step S126. The control unit 90, more specifically the performance line selection unit 90a and the controller 90c included in the control unit 90, selects the WOT line L2 as the performance line of the engine 50 at step S126. In the case where the current state of linkage of the rotor shaft 43 of the assist motor 40 is set to the state of under drive linkage and the target working point of the outer rotor shaft 35 is present in the under drive area, the WOT line L2 is selected as the performance line of the engine 50.

After selecting the WOT line L2 as the performance line of the engine 50, the control unit 90 determines the target working point of the engine 50 using the WOT line L2 and further determines the target working points of the assist motor 40 and the clutch motor 30 based on the target working point of the engine 50 at step S112. At subsequent step S114, the control unit 90 controls the operations of the engine 50, the assist motor 40, and the clutch motor 30, based on the respective target working points of the engine 50, the assist motor 40, and the clutch motor 30 determined in the above manner.

In the example described above, the working point of the outer rotor shaft 35 moves along the curve DO. In another example, the working point of the outer rotor shaft 35 moves along the other curve DU. Here it is assumed that the working point of the outer rotor shaft 35 is currently positioned at a point a1 on the curve DU in the graph of FIG. 8. Since the working point of the outer rotor shaft 35 is present in the area of higher torque than the WOT line L2, the current state of linkage of the rotor shaft 43 of the assist motor 40 is set to the state of under drive linkage.

When the program enters the processing routine of FIG. 9 under such conditions, the control unit 90 first determines whether the current state of linkage of the rotor shaft 43 of the assist motor 40 is set to the state of over drive linkage or to the state of under drive linkage at step S102 as described previously. Since the rotor shaft 43 of the assist motor 40 is currently set in the state of under drive linkage, the optimum fuel consumption line L1 is set as the boundary between the over drive area and the under drive area at step S120. In this case, the indeterminate area, that is, the area of higher torque than the optimum fuel consumption line L1 and of lower torque than the WOT line L2, is included in the under drive area.

As described previously, the control unit 90 obtains the desired output required by the driver and determines the target working point of the outer rotor shaft 35 functioning as the drive shaft, based on the desired output at step S122. The control unit 90 then determines whether or not the target working point of the outer rotor shaft 35 thus determined is present in the over drive area at step S124.

When the working point of the outer rotor shaft 35 is currently positioned at the point a1 and the target working point of the outer rotor shaft 35 determined in the above manner is positioned, for example, at a point a2 or a point a3 (see FIG. 8), which is included in the under drive area, the program proceeds to step S126. The processing executed in this case is identical with the processing carried out when the working point of the outer rotor shaft 35 is positioned at the point b5 and the target working point of the outer rotor shaft 35 is positioned at the point b6 described above. The details of the processing are thus omitted here.

In another example, it is assumed that the working point of the outer rotor shaft 35 is positioned at the point a1 and the target working point of the outer rotor shaft 35 determined at step S122 is positioned at a point a5 (see FIG. 8), which is included in the over drive area. The control unit 90 accordingly determines that the target working point of the outer rotor shaft 35 is present in the over drive area at step S124 and selects the optimum fuel consumption line L1 as the performance line of the engine 50 at step S128. In the case where the current state of linkage of the rotor shaft 43 of the assist motor 40 is set to the state of under drive linkage and the target working point of the outer rotor shaft 35 is present in the over drive area, the optimum fuel consumption line L1 is selected as the performance line of the engine 50.

The control unit 90 then sets the switching instruction flag, in order to change the state of linkage of the rotor shaft 43 of the assist motor 40 from the state of under drive linkage to the state of over drive linkage at step S130.

The control unit 90 determines the target working point of the engine 50 using the optimum fuel consumption line L1 selected as the performance line of the engine 50 and further determines the target working points of the assist motor 40 and the clutch motor 30 based on the target working point of the engine 50 at step S112. At subsequent step S114, the control unit 90 controls the operations of the engine 50, the assist motor 40, and the clutch motor 30, based on the respective target working points of the engine 50, the assist motor 40, and the clutch motor 30 determined in the above manner.

When the processing routine of FIG. 10 starts in parallel with the processing routine of FIG. 9, the control unit 90 first determines whether or not the switching instruction flag has been set at step S202 as described previously. In this example, since the switching instruction flag has been set at step S130 in the flowchart of FIG. 9, the program proceeds to step S204 to calculate the difference 'd' between the revolving speed of the inner rotor shaft 33 and the revolving speed of the outer rotor shaft 35 in the clutch motor 30 as described previously. The control unit 90 then determines whether the difference 'd' in revolving speed is in the predetermined range (−Nlim<d<Nlim) or out of the predetermined range at step S206.

Since the optimum fuel consumption line L1 has been selected as the performance line of the engine 50 at step S128 in the flowchart of FIG. 9, the working point of the engine 50 gradually moves on the optimum fuel consumption line L1. The working point of the outer rotor shaft 35, on the other hand, gradually moves on the curve DU from the point a1 to the point a5 (target working point) shown in FIG. 8.

When the working point of the outer rotor shaft 35 reaches an intersection a4 of the optimum fuel consumption line L1 and the curve DU, the working point of the engine 50 also reaches the intersection a4. Namely the working point of the outer rotor shaft 35 is identical with the working point of the engine 50 at this moment. The revolving speed of the engine 50 is accordingly identical with the revolving speed of the outer rotor shaft 35, and the revolving speed of the inner rotor shaft 33 is identical with the revolving speed of the outer rotor shaft 35 in the clutch motor 30. The difference 'd' in revolving speed is thus equal to zero.

In the case where the working point of the engine 50 moves along the optimum fuel consumption line L1 to approach the intersection a4 and the working point of the outer rotor shaft 35 moves along the curve DU to approach the intersection a4, the difference 'd' between the revolving speeds of the inner rotor shaft 33 and the outer rotor shaft 35 in the clutch motor 30 becomes within the predetermined range (−Nlim<d<Nlim). The control unit 90 then drives the actuator 86 and changes the state of linkage of the rotor shaft 43 of the assist motor 40 from the state of under drive linkage to the state of over drive linkage at step S208. The control unit 90 subsequently resets the switching instruction flag at step S210 and exits from the processing routine of FIG. 10.

In this manner, when the working point of the outer rotor shaft 35 moves along the curve DU from the point a1 to the intersection a4, the state of linkage of the rotor shaft 43 of the assist motor 40 is changed from the state of under drive linkage to the state of over drive linkage.

Here it is assumed that the program enters again the processing routine shown in the flowchart of FIG. 9, while the working point of the outer rotor shaft 35 moves from the intersection a4 to the point a5. The control unit 90 first determines whether the current state of linkage of the rotor shaft 43 of the assist motor 40 is set to the state of over drive linkage or to the state of under drive linkage at step S102 as described previously. Since the state of linkage of the rotor shaft 43 has been changed from the state of under drive linkage to the state of over drive linkage, the control unit 90 determines at this moment that the rotor shaft 43 of the assist motor 40 is set in the state of over drive linkage at step S102 and sets the WOT line L2 as the boundary between the over drive area and the under drive area at step S104.

The control unit 90 obtains the desired output required by the driver and determines the target working point of the outer rotor shaft 35 functioning as the drive shaft, based on the desired output at step S106. The control unit 90 determines whether or not the target working point of the outer rotor shaft 35 thus determined is present in the under drive area at step S108. When the working point of the outer rotor shaft 35 is positioned at the point a5 and the target working point of the outer rotor shaft 35 is positioned, for example, at a point a6 (see FIG. 8), which is within the over drive area, the program proceeds to step S110. The control unit 90 selects the optimum fuel consumption line L1 as the performance line of the engine 50 at step S110. In the case where the current state of linkage of the rotor shaft 43 of the assist motor 40 is set to the state of over drive linkage and the target working point of the outer rotor shaft 35 is present in the over drive area, the optimum fuel consumption line L1 is selected as the performance line of the engine 50.

After selecting the optimum fuel consumption line L1 as the performance line of the engine 50, the control unit 90 determines the target working point of the engine 50 using the optimum fuel consumption line L1 and further determines the target working points of the assist motor 40 and the clutch motor 30 based on the target working point of the engine 50 at step S112. At subsequent step S114, the control unit 90 controls the operations of the engine 50, the assist motor 40, and the clutch motor 30, based on the respective target working points of the engine 50, the assist motor 40, and the clutch motor 30 determined in the above manner.

(4) Effects of Embodiment

As described above, in the case where the working point of the outer rotor shaft 35 functioning as the drive shaft is present in the under drive area, the technique of the present invention mainly uses the WOT line L2, where the maximum torque of the engine 50 attains, as the performance line of the engine 50 that is used to determine the working point of the engine 50. This technique enables the greater torque to be output from the engine 50, compared with the conventional technique, when the working point of the outer rotor shaft 35 is present in the under drive area.

In the case where the working point of the outer rotor shaft 35 is present in the under drive area, the torque Ta of the assist motor 40 is expressed by the equation of Ta=Td−Te as shown by Equations (1) given above, where Td and Te respectively denote the torque of the outer rotor shaft 35 and the torque of the engine 50. This equation is rewritten to Td =Ta+Te. Namely the torque Td output from the outer rotor shaft 35 is equal to the sum of the torque Ta output from the assist motor 40 and the torque Te output from the engine 50. As clearly understood from Equations (1), the torque Te of the engine 50 is equal to the torque Tc of the clutch motor 30.

In the case where the working point of the outer rotor 35 is present in the under drive area, since the torque Te output from the engine 50 is greater than the torque output in the conventional structure, the technique of the embodiment enables the torque Td (especially the maximum torque) output from the outer rotor shaft 35 to be kept at an equivalent level to the value attained by the conventional technique even when the smaller torque Ta is output from the assist motor 40.

When the working point of the outer rotor shaft 35 functioning as the drive shaft is present in the under drive area, the arrangement of the embodiment effectively reduces the maximum load capacity of the assist motor 40 and decreases the maximum electric current of the inverter circuit (that is, the second driving circuit 92) for driving the assist motor 40, while ensuring a sufficient level of the maximum torque output from the outer rotor shaft 35. These characteristics advantageously reduce the size of the assist motor 40 and decrease the manufacturing cost of the inverter circuit.

Figure 11A:
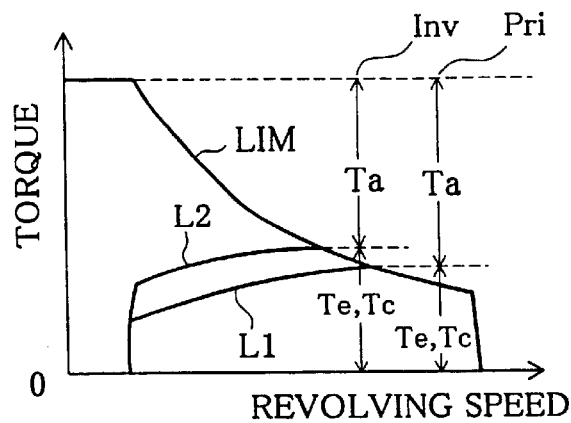
FIGS. 11A through 11C are graphs showing the comparison between the characteristics of the power output apparatus and the assist motor of the present invention and those of a prior art structure.
Figure 11B:
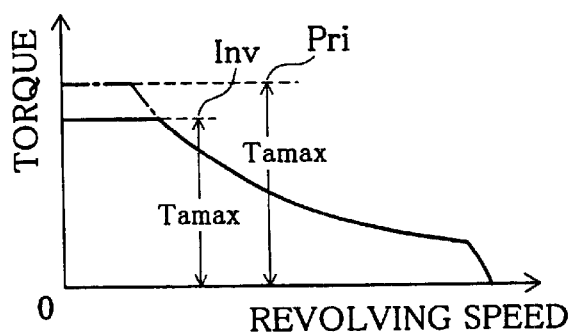
Figure 11C:
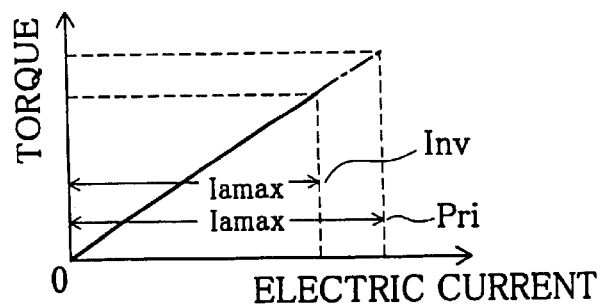

FIGS. 11A through 11C are graphs showing the comparison between the characteristics of the power output apparatus and the assist motor of the present invention and those of a prior art structure. FIG. 11A shows the working characteristics of the power output apparatus, which corresponds to the graph of FIG. 8. FIG. 11B shows the output characteristics of the assist motor, and FIG. 11C chows the current-torque characteristics of the assist motor. In the graphs of FIGS. 11A and 11B, the torque is plotted as ordinate and the revolving speed as abscissa. In the graph of FIG. 11C, the torque is plotted as ordinate and the electric current as abscissa. In the graphs of FIGS. 11A through 11C, Inv represents the present invention and Pri represents the prior art.

Referring to FIG. 11A, in the case where the working point of the drive shaft is present in the under drive area and the maximum torque is output from the drive shaft, the prior art technique uses the optimum fuel consumption line L1 as the engine performance line, whereas the technique of the present invention uses the WOT line L2 as the engine performance line. The technique of the present invention thus enables a greater torque Te to be output from the engine. Since the greater torque Te is output from the engine (that is, the greater torque Tc is output from the clutch motor), the torque Ta output from the assist motor can be decreased, compared with the prior art structure.

As clearly understood from the output characteristics of the assist motor shown in FIG. 11B, the technique of the present invention reduces a maximum torque Tamax of the assist motor, compared with the prior art technique. This favorably reduces the maximum load capacity of the assist motor. As clearly understood from the current-torque characteristics of the assist motor shown in FIG. 11C, the technique of the present invention decreases a maximum electric current Iamax supplied to the assist motor with the decrease in maximum torque Tamax of the assist motor, compared with the prior art technique. This favorably decreases the maximum electric current of the inverter circuit for driving the assist motor.

The technique of the embodiment is not required to take into account the maximum load capacity of the assist motor 40 and the maximum electric current of the inverter circuit, when the working point of the outer rotor shaft 35 or the drive shaft is present in the over drive area. In this case, the optimum fuel consumption line L1 attaining the highest efficiency of the engine 50 is thus mainly used as the performance line that is used to determine the working point of the engine 50. This arrangement enables the operation of the engine 50 at the highest efficiency when the working point of the outer rotor shaft 35 is present in the over drive area. This improves the driving efficiency of the whole power output apparatus 10.

In the embodiment discussed above, the boundary between the over drive area and the under drive area is used as the criterion for change-over of the performance line of the engine 50 and switch-over of the linkage of the rotor shaft 43 of the assist motor 40. The boundary is set on the WOT line L2 when the rotor shaft 43 of the assist motor 40 is set in the state of over drive linkage. The boundary is set on the optimum fuel consumption line L1, on the other hand, when the rotor shaft 43 of the assist motor 40 is set in the state of under drive linkage. The boundary set in the case of a shift from the state of over drive linkage to the state of under drive linkage is thus different from the boundary set in the case of a shift from the state of under drive linkage to the state of over drive linkage. This ensures a hysteresis respectively in the process of change-over of the performance line of the engine 50 and in the process of switch-over of the linkage of the rotor shaft 43 of the assist motor 40. If the same boundary is set as the criterion for change-over of the performance line of the engine 50 and switch-over of the linkage of the rotor shaft 43 of the assist motor 40 both in the case of a shift from the state of over drive linkage to the state of under drive linkage and in the case of a shift from the state of under drive linkage to the state of over drive linkage, the frequency of the change-over of the performance line and the switch-over of the linkage may undesirably increase in the case where the working point of the outer rotor shaft 35 is kept in the vicinity of the boundary. In order to prevent the frequent change-over and switch-over, the arrangement of the embodiment sets the different boundaries in the case of a shift from the state of over drive linkage to the state of under drive linkage and in the case of a shift from the state of under drive linkage to the state of over drive linkage and ensures the hysteresis in the change-over and switch-over processes.

Figure 12:
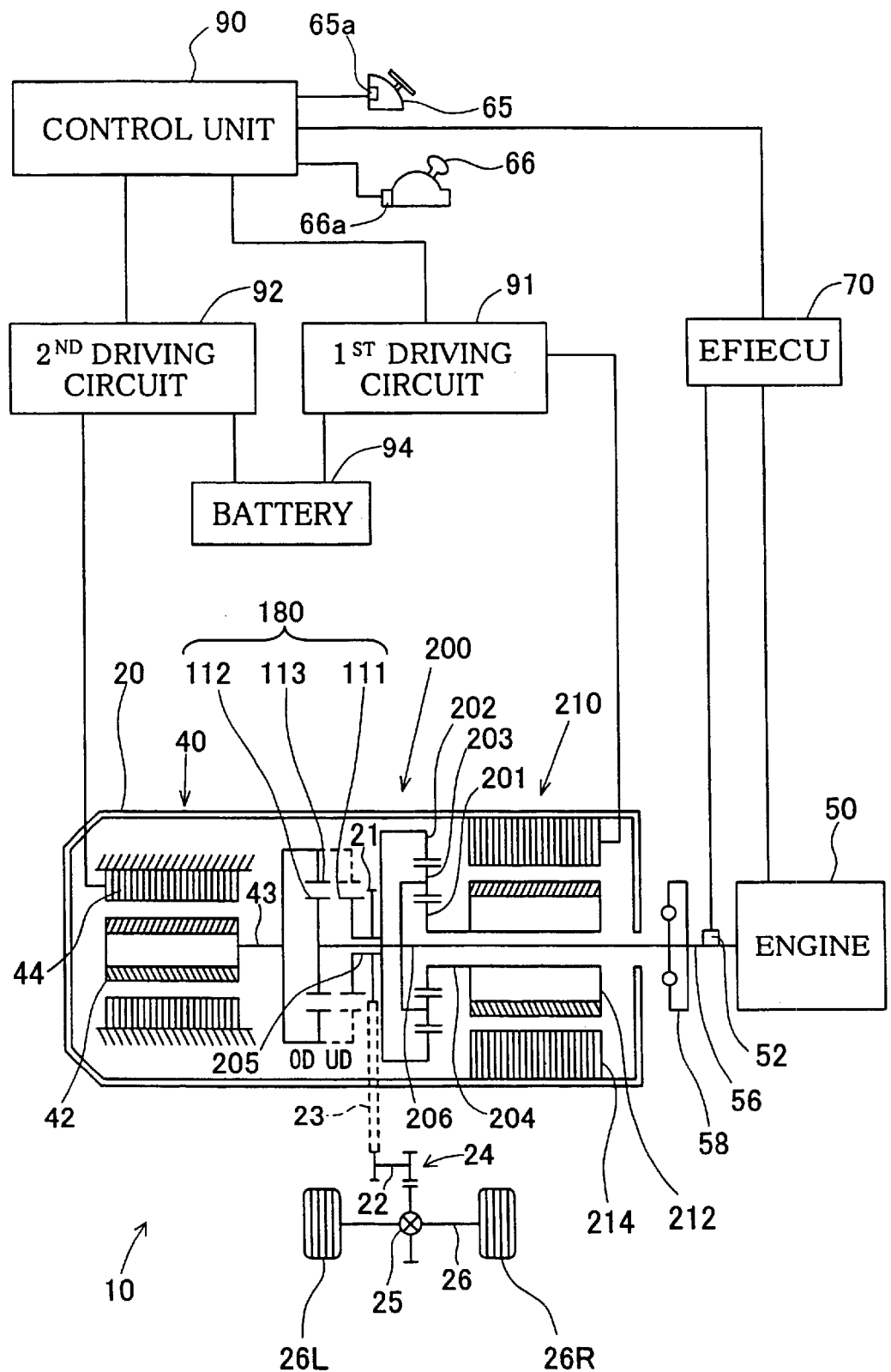
FIG. 12 shows one modification of the power output apparatus 10 of the embodiment.

In the power output apparatus 10 of the embodiment shown in FIG. 1, the clutch motor 30 is used as the power regulation unit that regulates the power output from the engine 50 with input and output of electric power and transmits the regulated power. The principle of the present invention is, however, not restricted to this configuration. As shown in FIG. 12, a combination of a planetary gear 200 and a motor generator 210 may be used as the power regulation unit, in place of the clutch motor 30.

FIG. 12 shows one modification of the power output apparatus 10 of the embodiment. The modified structure of FIG. 12 is basically similar to the structure of the power output apparatus 10 shown in FIG. 1, except that the planetary gear 200 and the motor generator 210 are applied for the power regulation unit. A linkage switching unit 180 used in the example of FIG. 12 has the same basic structure as that of the linkage switching unit 80 of the embodiment. The illustration of FIG. 12 includes a damper 58, which is omitted from the illustration of FIG. 1.

The planetary gear 200 includes a sun gear 201 that revolves on the center, a planetary carrier 203 with a planetary pinion gear that revolves both round the sun gear 201 and on its axis, and a ring gear 202 that further revolves round the planetary pinion gear. The sun gear 201, the planetary carrier 203, and the ring gear 202 have different rotating shafts. A sun gear shaft 204 that is the rotating shaft of the sun gear 201 is hollow and linked with a rotor 212 of the motor generator 210. A planetary carrier shaft 206 that is the rotating shaft of the planetary carrier 203 is linked with the crankshaft 56 of the engine 50 via the damper 58. A ring gear shaft 205 that is the rotating shaft of the ring gear 202 functions as the drive shaft and is connected with the transmission shaft 22 via the output gear 21 and the chain 23. The transmission shaft 22 is further connected with the axle 26 with the driving wheels 26R and 26L via the reduction gear unit 24 and the differential gear 25.

In the planetary gear 200, the following relations hold between the revolving speeds and the torque of the three shafts, that is, the sun gear shaft 204, the planetary carrier shaft 206, and the ring gear shaft 205 as is well known in the field of mechanics. When the power conditions of the two rotating shafts among the three rotating shafts are determined, the power condition of the residual rotating shaft is automatically determined according to Equations (3) given below:

$$Ns=(1+\rho)/\rho \times Nc - Nr/\rho$$

$$Nc=\rho/(1+\rho) \times Ns + Nr/(1+\rho)$$

$$Nr=(1+\rho)Nc - \rho Ns$$

$$Ts=Tc \times \rho/(1+\rho) = \rho Tr$$

$$Tr=Tc/(1+\rho) \qquad (3)$$

where $\rho$ denotes the number of teeth in the sun gear 201 to the number of teeth in the ring gear 202, Ns represents the revolving speed of the sun gear shaft 204, Ts represents the torque of the sun gear shaft 204, Nc (=Ne) represents the revolving speed of the planetary carrier shaft 206, Tc (=Te) represents the torque of the planetary carrier shaft 206, Nr (=Nd) represents the revolving speed of the ring gear shaft 205, and Tr (=Td) represents the torque of the ring gear shaft 205.

The motor generator 210 has the same structure as that of the assist motor 40. Namely the motor generator 210 is constructed as a three-phase synchronous motor including a stator 214 with coils wound thereon and the rotor 212 with permanent magnets attached thereon. The stator 214 is fixed to the casing. The flow of the three-phase alternating currents through the coils wound on the stator 214 generates a revolving magnetic field. The rotor 212 is then rotated by the interaction between the revolving magnetic field of the coils and the permanent magnets attached on the rotor 212. When the rotor 212 is rotated by an external force, the motor generator 210 works as a generator and regenerates the power as electric power. The coils wound on the stator 214 in the motor generator 210 are electrically connected with the first driving circuit 91, in the same manner as the clutch motor 30 of FIG. 1. The control unit 90 switches on and off the transistors included in the first driving circuit 91 and thereby controls the operation of the motor generator 210.

In the modified structure of FIG. 12, the combination of the planetary gear 200 and the motor generator 210 has the equivalent function to that of the clutch motor 30 shown in FIG. 1. The planetary carrier shaft 206 corresponds to the inner rotor shaft 33 of the clutch motor 30. The ring gear shaft 205 corresponds to the outer rotor shaft 35 functioning as the drive shaft. The combination of the planetary gear 200 and the motor generator 210 attains the function of the power regulation unit as discussed below.

When the power is input from the engine 50 to the planetary carrier shaft 206, the ring gear 202 and the sun gear 201 rotate according to Equations (3) given above. It is possible to stop the rotation of either the ring gear 202 or the sun gear 201. The rotation of the ring gear 202 enables part of the power output from the engine 50 to be transmitted in a mechanical form to the ring gear shaft 205 functioning as the drive shaft. The rotation of the sun gear 201, on the other hand, enables the other part of the power output from the engine 50 to be regenerated as electric power by the motor generator 210. When the motor generator 210 carries out the power operation, the torque output from the motor generator 210 is mechanically transmitted to the ring gear shaft 205 or the drive shaft via the sun gear 201, the planetary carrier 203, and the ring gear 202. The power operation of the motor generator 210 thus enables the torque output from the engine 50 to be increased and output to the ring gear shaft 205 or the drive shaft. In this modified structure, the combination of the planetary gear 200 and the motor generator 210 has the similar function to that of the clutch motor 30 shown in FIG. 1.

The linkage switching unit 180 of this modified structure has a first gear 111, a second gear 112, and a third gear 113 and changes the destination of linkage of the rotor shaft 43 of the assist motor 40 between the ring gear shaft 205 and the planetary carrier shaft 206 in the planetary gear 200. Like the linkage switching unit 80 shown in FIG. 1, the linkage switching unit 180 has an actuator for the change-over operation, which is connected with the control unit 90, although it is omitted from the illustration.

The engagement and disengagement between these gears attain different states of linkage. For example, when the first gear 111 engages with the third gear 113, the rotor shaft 43 of the assist motor 40 is linked with the ring gear shaft 205 of the planetary gear 200. The power output from the engine 50 is thus transmitted to the ring gear shaft 205 or the drive shaft via the planetary gear 200 and the assist motor 40. This represents the state of linkage corresponding to the state of under drive linkage (shown in FIG. 2) in the structure of FIG. 1.

In another example, when the linkage switching unit 180 is controlled to engage the second gear 112 with the third gear 113, the rotor shaft 43 of the assist motor 40 is linked with the planetary carrier shaft 206 of the planetary gear 200. The power output from the engine 50 is thus transmitted to the ring gear shaft 205 or the drive shaft via the assist motor 40 and the planetary gear 200. This represents the state of linkage corresponding to the state of over drive linkage (shown in FIG. 3) in the structure of FIG. 1.

This modified structure can exert the similar effects to those of the embodiment shown in FIG. 1 by executing the processing routine of controlling the operations shown in the flowchart of FIG. 9 and the processing routine of changing the state of linkage of the rotor shaft 43 of the assist motor 40 shown in the flowchart of FIG. 10. In the modified structure, however, the clutch motor 30 in the flowchart of FIG. 9 should be replaced with the motor generator 210.

The principle of the present invention is applicable to a four-wheel drive vehicle. The power system in the structure of the embodiment (see FIG. 1) or in the modified structure (see FIG. 12) is applied to front wheels of the vehicle, while a separate motor for driving rear wheels is mounted on the axle of the rear wheels. This arrangement enables the construction of a four-wheel drive hybrid vehicle. The four-wheel drive hybrid vehicle attains the high driving efficiency by changing the state of linkage of the drive shaft according to the relationship between the revolving speed of the drive shaft and the revolving speed of the engine. Application of the technique of the present invention to control the process of changing the state of linkage in the four-wheel drive hybrid vehicle ensures the variety of effects discussed in the above embodiment.

The present invention is not restricted to the above embodiment or its modifications, but there may be many other modifications, changes, and alterations without departing from the scope or spirit of the main characteristics of the present invention. For example, although a gasoline engine driven with gasoline is used for the engine 50 in the above embodiment, the principle of the present invention is also applicable to a variety of other internal and external combustion engines, such as Diesel engines, other reciprocating engines, turbine engines, jet engines, and rotary engines.

In the above embodiment, the permanent magnet (PM) type synchronous motors are used for the clutch motor 30 and the assist motor 40. Examples of other applicable motors include variable reluctance (VR) type synchronous motors, vernier motors, d.c. motors, induction motors, and super-conducting motors, which carry out both the regenerative operation and the power operation. Dynamotors and step motors that carry out only the power operation may also be applicable.

The relationship between the inner rotor and the outer rotor of the clutch motor 30 and the external rotating shafts may be reverse to that discussed in the above embodiment. A pair of disc rotors facing each other may be used in place of the outer rotor and the inner rotor.

The transistor inverters are used for the first and the second driving circuits 91 and 92 in the above embodiment. Other examples applicable for the driving circuits 91 and 92 include IGBT (insulated gate bipolar mode transistor) inverters, thyristor inverters, voltage PWM (pulse width modulation) inverters, square wave inverters (voltage inverters and current inverters), and resonant inverters.

The battery 94 used as a secondary battery in the embodiment may be a Pb battery, an NiMH battery, or a L1 battery. A capacitor may replace the battery 94. In the above embodiment, the CPU executes the software programs to implement the variety of control procedures. The control procedures may, however, be actualized by a hardware configuration.

In the above embodiment, the power output apparatus of the present invention is mounted on the hybrid vehicle. The power output apparatus of the present invention may, however, be mounted on other transportation means like shipping and aircraft and a variety of industrial equipment like machine tools, as long as they have two output shafts.

The scope and spirit of the present invention are limited only by the terms of the appended claims.

What is claimed is:

1. A power output apparatus comprising an engine with an output shaft, a drive shaft to which power is output, a power regulation unit that is connected with both the output shaft and the drive shaft, regulates power output from said engine with input and output of electric power, and transmits the regulated power to the drive shaft, a motor with a rotating shaft, and a linkage mechanism that selectively links the rotating shaft of said motor with either one of the output shaft and the drive shaft, wherein a performance area, which is defined by a relationship between torque and revolving speed, is divided by a first performance line and a second performance line, which has a higher torque in a predetermined range of revolving speed than the first performance line, into a first area that mainly adjoins to the first performance line, a second area that is interposed between the first performance line and the second performance line, and a third area that mainly adjoins to the second performance line, said power output apparatus further comprising:

a performance line selection unit that selects either one of the first performance line and the second performance line as an engine performance line that is used to determine a working point of said engine in the performance area according to a state of the linkage mechanism; and a control unit that causes said performance line selection unit to select the first performance line as the engine performance line in the case where a working point of the drive shaft is present in the first area, and to select the second performance line as the engine performance line in the case where the working point of the drive shaft is present in the third area.

2. A power output apparatus in accordance with claim 1, said power output apparatus further comprising:
- an area determination unit that determines an area, in which a target working point of the drive shaft is present, based on an externally required output,
- wherein, in the case where the first performance line has been selected as the engine performance line, said control unit causes said performance line selection unit to change the selected engine performance line from the first performance line to the second performance line when said area determination unit determines that the target working point of the drive shaft is present in the third area,
- in the case where the second performance line has been selected as the engine performance line, said control unit causing said performance line selection unit to change the selected engine performance line from the second performance line to the first performance line when said area determination unit determines that the target working point of the drive shaft is present in the first area.

3. A power output apparatus in accordance with claim 2, wherein, in the case where the first performance line has been selected as the engine performance line, said control unit causes said performance line selection unit to keep the selection of the first performance line as the engine performance line even when the working point of the drive shaft is present in the second area, until said area determination unit determines that the target working point of the drive shaft is present in the third area,
- in the case where the second performance line has been selected as the engine performance line, said control unit causing said performance line selection unit to keep the selection of the second performance line as the engine performance line even when the working point of the drive shaft is present in the second area, until said area determination unit determines that the target working point of the drive shaft is present in the first area.

4. A power output apparatus in accordance with claim 1, wherein said control unit causes said linkage mechanism to link the rotating shaft of said motor with the output shaft of said engine in the case where the working point of the drive shaft is present in the first area,
- said control unit causing said linkage mechanism to link the rotating shaft of said motor with the drive shaft in the case where the working point of the drive shaft is present in the third area.

5. A power output apparatus in accordance with claim 4, wherein, in the case where the rotating shaft of said motor has been linked with the output shaft of said engine, said control unit causes said linkage mechanism to keep the linkage of the rotating shaft of said motor with the output shaft even when the working point of the drive shaft is present in the second area,
- in the case where the rotating shaft of said motor has been linked with the drive shaft, said control unit causing said linkage mechanism to keep the linkage of the rotating shaft of said motor with the drive shaft even when the working point of the drive shaft is present in the second area.

6. A power output apparatus in accordance with claim 5, wherein, in the case where the rotating shaft of said motor has been linked with the output shaft of said engine, said control unit causes said linkage mechanism to change the destination of linkage of the rotating shaft of said motor from the output shaft to the drive shaft when the working point of the drive shaft exceeds the second performance line,
- in the case where the rotating shaft of said motor has been linked with the drive shaft, said control unit causing said linkage mechanism to change the destination of linkage of the rotating shaft of said motor from the drive shaft to the output shaft when the working point of the drive shaft exceeds the first performance line.

7. A power output apparatus in accordance with claim 4, said power output apparatus further comprising:
- an area determination unit that determines an area, in which a target working point of the drive shaft is present, based on an externally required output,
- wherein, in the case where the rotating shaft of said motor is linked with the output shaft, said control unit causes said performance line selection unit to change the selected engine performance line from the first performance line to the second performance line when said area determination unit determines that the target working point of the drive shaft is present in the third area,
- in the case where the rotating shaft of said motor is linked with the drive shaft, said control unit causing said performance line selection unit to change the selected engine performance line from the second performance line to the first performance line when said area determination unit determines that the target working point of the drive shaft is present in the first area.

8. A power output apparatus in accordance with claim 1, wherein the first performance line attains a highest efficiency of said engine, and the second performance line attains a maximum torque of said engine at each revolving speed.

9. A power output apparatus in accordance with claim 1, wherein said power regulation unit comprises a pair-rotor motor including a first rotor connected with the output shaft of said engine and a second rotor connected with the drive shaft.

10. A power output apparatus in accordance with claim 1, wherein said power regulation unit comprises:
- a generator having a rotor shaft; and
- a planetary gear having three rotating shafts, which are respectively linked with the output shaft of said engine, the drive shaft, and the rotor shaft.

11. A method of controlling a power output apparatus, which comprises an engine with an output shaft, a drive shaft to which power is output, a power regulation unit that is connected with both the output shaft and the drive shaft, regulates power output from said engine with input and output of electric power, and transmits the regulated power to the drive shaft, a motor with a rotating shaft, and a linkage mechanism that selectively links the rotating shaft of said motor with either one of the output shaft and the drive shaft,
- wherein a performance area, which is defined by relationship between torque and revolving speed, is divided by a first performance line and a second performance line, which has a higher torque in a predetermined range of revolving speed than the first perform line, into a first area that mainly adjoins to the first performance line, a second area that is interposed between the first performance line and the second performance line, and a third area that mainly adjoins to the second performance line, said method comprising the steps of:
- (a) selecting either one of the first performance line and the second performance line as an engine a performance line that is used to determine a working point of said engine in the performance area according to a state of the linkage mechanism; and
- (b) selecting the first performance line as the engine performance line in the case where a working point of the drive shaft is present in the first area, and selecting the second performance line as the engine performance line in the case where the working point of the drive shaft is present in the third area.

12. A method in accordance with claim 11, said method further comprising the steps of:

(c) determining an area, in which a target working point of the drive shaft is present, based on an externally required output; and (d) in the case where the first performance line has been selected as the engine performance line, changing the selected engine performance line from the first performance line to the second performance line when it is determined in said step (c) that the target working point of the drive shaft is present in the third area, and in the case where the second performance line has been selected as the engine performance line, changing the selected engine performance line from the second performance line to the first performance line when it is determined in said step (c) that the target working point of the drive shaft is present in the first area.

13. A method in accordance with claim 11, said method further comprising the step of:

(c) causing said linkage mechanism to link the rotating shaft of said motor with the output shaft of said engine in the case where the working point of the drive shaft is present in the first area, and causing said linkage mechanism to link the rotating shaft of said motor with the drive shaft in the case where the working point of the drive shaft is present in the third area.

14. A method in accordance with claim 13, said method further comprising the step of:

(d) in the case where the rotating shaft of said motor has been linked with the output shaft of said engine, causing said linkage mechanism to keep the linkage of the rotating shaft of said motor with the output shaft even when the working point of the drive shaft is present in the second area, and in the case where the rotating shaft of said motor has been linked with the drive shaft, causing said linkage mechanism to keep the linkage of the rotating shaft of said motor with the drive shaft even when the working point of the drive shaft is present in the second area.

15. A method in accordance with claim 14, said method further comprising the step of:

(e) in the case where the rotating shaft of said motor has been linked with the output shaft of said engine, causing said linkage mechanism to change the destination of linkage of the rotating shaft of said motor from the output shaft to the drive shaft when the working point of the drive shaft exceeds the second performance line, and in the case where the rotating shaft of said motor has been linked with the drive shaft, causing said linkage mechanism to change the destination of linkage of the rotating shaft of said motor from the drive shaft to the output shaft when the working point of the drive shaft exceeds the first performance line.

16. A method in accordance with claim 13, said method further comprising the steps of:

(f) determining an area, in which a target working point of the drive shaft is present, based on an externally required output; and (g) in the case where the rotating shaft of said motor is linked with the output shaft, changing the selected engine performance line from the first performance line to the second performance line when it is determined in said step (f) that the target working point of the drive shaft is present in the third area, and in the case where the rotating shaft of said motor is linked with the drive shaft, changing the selected engine performance line from the second performance line to the first performance line when it is determined in said step (f) that the target working point of the drive shaft is present in the first area.

* * * * *